(12) United States Patent
Tabkhivayghan

(10) Patent No.: US 12,620,233 B2
(45) Date of Patent: May 5, 2026

(54) SCALABLE INTELLIGENT VIDEO SURVEILLANCE FOR THE ARTIFICIAL INTELLIGENCE OF THINGS

(71) Applicant: The University Of North Carolina At Charlotte, Charlotte, NC (US)

(72) Inventor: Hamed Tabkhivayghan, Charlotte, NC (US)

(73) Assignee: The University Of North Carolina At Charlotte, Charlotte, NC (US)

( * ) Notice: Subject to any disclaimer, the term of this patent is extended or adjusted under 35 U.S.C. 154(b) by 126 days.

(21) Appl. No.: 18/653,086

(22) Filed: May 2, 2024

(65) Prior Publication Data

US 2026/0024339 A1    Jan. 22, 2026

Related U.S. Application Data

(63) Continuation-in-part of application No. 17/716,671, filed on Apr. 8, 2022, now abandoned.

(60) Provisional application No. 63/463,586, filed on May 3, 2023.

(51) Int. Cl.
| | |
|---|---|
| *G06V 20/52* | (2022.01) |
| *G06V 10/96* | (2022.01) |
| *G06V 40/20* | (2022.01) |
| *H04N 7/18* | (2006.01) |
| *G06V 10/82* | (2022.01) |

(52) U.S. Cl.
CPC .............. *G06V 20/52* (2022.01); *G06V 10/96* (2022.01); *G06V 40/25* (2022.01); *H04N 7/181* (2013.01); *G06V 10/82* (2022.01)

(58) Field of Classification Search
None
See application file for complete search history.

(56)    References Cited

U.S. PATENT DOCUMENTS

| | | | | |
|---|---|---|---|---|
| 10,721,435 | B2 * | 7/2020 | Saito .................. | G08B 13/1966 |
| 2018/0302414 | A1 * | 10/2018 | Wagner ................ | H04L 63/107 |
| 2019/0325199 | A1 * | 10/2019 | Wang ................... | G06V 40/103 |
| 2020/0117900 | A1 * | 4/2020 | Deng ...................... | F41G 3/147 |
| 2020/0125923 | A1 * | 4/2020 | Jones ................. | G06F 18/2433 |
| 2020/0327465 | A1 * | 10/2020 | Baek ......................... | G06N 3/08 |
| 2021/0360201 | A1 * | 11/2021 | Hu .......................... | H04N 23/61 |
| 2023/0164336 | A1 * | 5/2023 | Cricri ..................... | H04N 19/46 |
| | | | | 375/240.08 |

* cited by examiner

*Primary Examiner* — Daniel T Tekle
(74) *Attorney, Agent, or Firm* — Clements Bernard Walker; Christopher L. Bernard; Devin Cummins

(57)    ABSTRACT

An artificial intelligence (AI) software product for providing scalable intelligent video surveillance for the artificial intelligence of things. The AI software product performs operations including receiving, at an edge node, a sequence of images of a target environment, where the AI software product resides in the edge node, and where the edge node is local to the target environment. The AI software product further observes one or more target objects in the sequence of images of the target environment in real time. The AI software product further detects at the edge node one or more anomalies in the target environment based on the observing of the one or more target objects in real time, where the one or more anomalies are specific to the target environment.

20 Claims, 18 Drawing Sheets

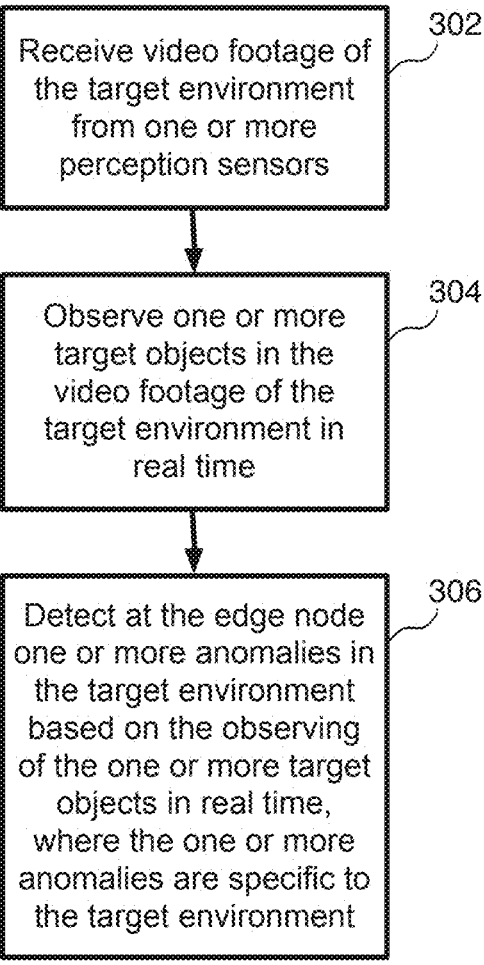

Receive video footage of
the target environment
from one or more
perception sensors

302

Observe one or more
target objects in the
video footage of the
target environment in
real time

304

Detect at the edge node
one or more anomalies in
the target environment
based on the observing
of the one or more target
objects in real time,
where the one or more
anomalies are specific to
the target environment

Primary
Extracted
Data
502

High-level
Extracted
Features
504

500

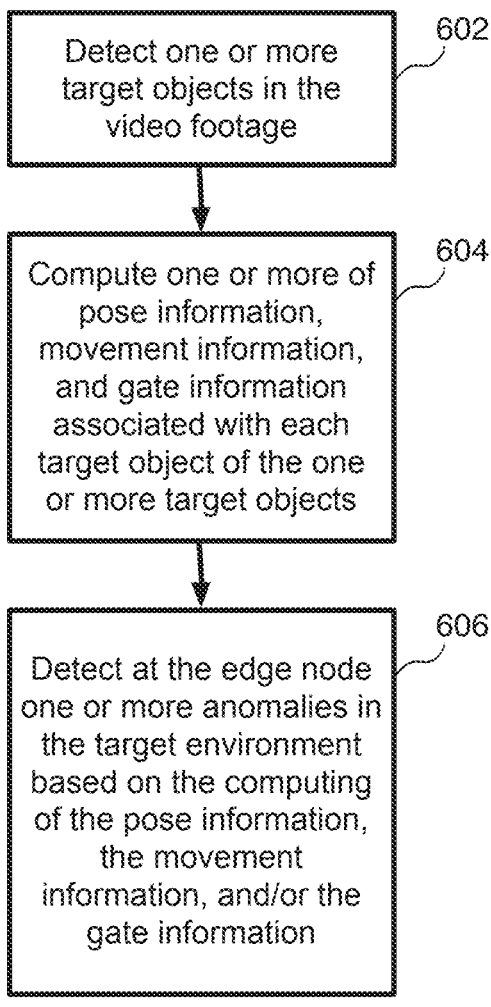

Detect one or more target objects in the video footage — 602

Compute one or more of pose information, movement information, and gate information associated with each target object of the one or more target objects — 604

Detect at the edge node one or more anomalies in the target environment based on the computing of the pose information, the movement information, and/or the gate information — 606

Extracted Features 802

Multi-modal Anomaly Detector 804

Anomaly Score 806

Threshold Adjustment Module 808

Decision 810

800

1000

1200

1600

1700

SCALABLE INTELLIGENT VIDEO SURVEILLANCE FOR THE ARTIFICIAL INTELLIGENCE OF THINGS

CROSS-REFERENCE TO RELATED APPLICATIONS

The present disclosure claims the benefit of priority of co-pending U.S. provisional patent application No. 63/463,586, filed May 3, 2023, the entire contents of which are hereby incorporated by reference.

The present disclosure further is a continuation-in-part (CIP) and claims the benefit of priority of co-pending U.S. patent application Ser. No. 17/716,671, filed Apr. 8, 2022, which in turn claims the benefit of priority of U.S. provisional patent application No. 63/327,840, filed on Apr. 6, 2022, and is a CIP and claims the benefit of priority of U.S. patent application Ser. No. 17/031,318, filed Sep. 24, 2020, which in turn claims the benefit of priority of U.S. provisional patent application Nos. 62/908,778, filed on Oct. 1, 2019, and 63/082,040, filed on Sep. 23, 2020, the entire contents of all of which are hereby incorporated by reference.

STATEMENT OF GOVERNMENT INTEREST

This invention was made with government support under award nos.: 1831795 and 1848727 awarded by the National Science Foundation. The government has certain rights in the invention.

INTRODUCTION

There is a growing need for effective and efficient surveillance technologies that can be deployed to protect cities, people, and infrastructure. For example, in Itaewon, South Korea, a holiday celebration left over 150 dead due to severe overcrowding, with many blaming the tragedy on careless government oversight. In Moore County, North Carolina, directed attacks against two power substations left over 45,000 residents without power for days as technicians rushed to restore power and authorities struggled to find the source of the attacks. With enough forewarning through smart video surveillance, they could have been prevented.

The present introduction is provided as background context only and is not intended to be limiting in any manner. It will be readily apparent to those of ordinary skill in the art that the concepts and principles of the present disclosure may be implemented in other applications and contexts equally.

SUMMARY

In one illustrative embodiment, the present disclosure provides a system including: an edge node configured to receive a sequence of images (e.g., video footage) of a target environment from one or more perception sensors, where the edge node is local to the target environment and the one or more perception sensors; a local node associated with the edge node, where the local node comprises an artificial intelligence (AI) pipeline configured to process the video footage received from the one or more perception sensors; and a global node associated with the edge node, where the global node is configured to process the video footage received from the AI pipeline and configured to send processed anomaly information to a cloud server. The system further includes one or more processors, and logic encoded in one or more non-transitory computer-readable storage media for execution by the one or more processors. When executed the logic is operable to cause the one or more processors to perform operations comprising: receiving the video footage of the target environment from the one or more perception sensors; observing one or more target objects in the video footage of the target environment in real time; and detecting at the edge node one or more anomalies in the target environment based on the observing of the one or more target objects in real time, where the one or more anomalies are specific to the target environment. Optionally, in some embodiments, the edge node comprises AI technologies that are trained globally for environments in general and trained locally for the target environment. In some embodiments, the logic when executed by one or more processors is operable to cause the one or more processors to perform operations comprising: segmenting the video footage of the target environment, where the video footage comprises video footage from multiple perception sensors of the one or more perception sensors; analyzing the one or more target objects in the video footage from the multiple perception sensors, where the video footage provides multiple perspectives of the one or more target objects in the target environment; and detecting at the edge node the one or more anomalies in the target environment based on the analyzing of the one or more target objects. In some embodiments, the logic when executed by one or more processors is operable to cause the one or more processors to perform operations comprising: detecting the one or more target objects in the video footage, where the video footage comprises video footage from multiple perception sensors of the one or more perception sensors; computing one or more of pose information, movement information, and gait information associated with each target object of the one or more target objects; and detecting at the edge node the one or more anomalies in the target environment based on the computing of the pose information, the movement information, and/or the gait information. In some embodiments, the target environment is a public environment. In some embodiments, the logic when executed by one or more processors are operable to cause the one or more processors to perform operations comprising detecting the one or more anomalies in the target environment without collecting personal identification information. In some embodiments, the situational awareness system comprises legacy components for monitoring the target environment.

In another illustrative embodiment, the present disclosure provides an AI software product with program instructions. The program instructions when executed by one or more processors are operable to cause the one or more processors to perform operations comprising: receiving, at an edge node, a sequence of images (e.g., video footage) of a target environment from one or more perception sensors, where the AI software product resides in the edge node, where the edge node is local to the target environment and the one or more perception sensors, where the AI software product comprises a local node module and a global node module, where the local module comprises an AI pipeline configured to process the video footage received from the one or more perception sensors, and where the global node module is configured to process the video footage received from the AI pipeline and configured to send processed anomaly information to a cloud server; observing one or more target objects in the video footage of the target environment in real time; and detecting at the edge node one or more anomalies in the target environment based on the observing of the one or more target objects in real time, where the one or more anomalies are specific to the target environment. Optionally, in some embodiments, the edge node comprises AI technologies that are trained globally for environments in general and trained locally for the target environment. In some embodiments, the instructions when executed are further operable to cause the one or more processors to perform operations comprising: segmenting the video footage of the target environment, where the video footage comprises video footage from multiple perception sensors of the one or more perception sensors; analyzing the one or more target objects in the video footage from the multiple perception sensors, where the video footage provides multiple perspectives of the one or more target objects in the target environment; and detecting at the edge node the one or more anomalies in the target environment based on the analyzing of the one or more target objects. In some embodiments, the instructions when executed are further operable to cause the one or more processors to perform operations comprising: detecting the one or more target objects in the video footage, where the video footage comprises video footage from multiple perception sensors of the one or more perception sensors; computing one or more of pose information, movement information, and gait information associated with each target object of the one or more target objects; and detecting at the edge node the one or more anomalies in the target environment based on the computing of the pose information, the movement information, and/or the gait information. In some embodiments, the target environment is a public environment. In some embodiments, the instructions when executed are further operable to cause the one or more processors to perform operations comprising detecting the one or more anomalies in the target environment without collecting personal identification information. In some embodiments, the situational awareness system comprises legacy components for monitoring the target environment.

In a further illustrative embodiment, the present disclosure provides a computer-implemented method for detecting anomalies in a target environment, the method including: receiving, at an edge node, a sequence of images (e.g., video footage) of the target environment from one or more perception sensors, where the edge node is local to the target environment and the one or more perception sensors, where the edge node comprises a local node and a global node, where the local node comprises an AI pipeline configured to process the video footage received from the one or more perception sensors, and where the global node is configured to process the video footage received from the AI pipeline and configured to send processed anomaly information to a cloud server; observing one or more target objects in the video footage of the target environment in real time; and detecting at the edge node one or more anomalies in the target environment based on the observing of the one or more target objects in real time, where the one or more anomalies are specific to the target environment. Optionally, in some embodiments, the edge node comprises AI technologies that are trained globally for environments in general and trained locally for the target environment. In some embodiments, the method further includes: segmenting the video footage of the target environment, where the video footage comprises video footage from multiple perception sensors of the one or more perception sensors; analyzing the one or more target objects in the video footage from the multiple perception sensors, where the video footage provides multiple perspectives of the one or more target objects in the target environment; and detecting at the edge node the one or more anomalies in the target environment based on the analyzing of the one or more target objects. In some embodiments, the method further includes: detecting the one or more target objects in the video footage, where the video footage comprises video footage from multiple perception sensors of the one or more perception sensors; computing one or more of pose information, movement information, and gait information associated with each target object of the one or more target objects; and detecting at the edge node the one or more anomalies in the target environment based on the computing of the pose information, the movement information, and/or the gait information. In some embodiments, the target environment is a public environment. In some embodiments, the method further includes detecting the one or more anomalies in the target environment without collecting personal identification information.

BRIEF DESCRIPTION OF THE DRAWINGS

The present disclosure is illustrated and described with reference to the various drawings, in which like reference numbers are used to denote like system components and/or method steps, as appropriate.

FIG. 3 is a flow chart for detecting anomalies in a target environment.

FIG. 6 is a flow chart for detecting anomalies in a target environment based on computations of pose information, movement information, and/or gait information.

DETAILED DESCRIPTION

With the advancement of vision-based artificial intelligence, the proliferation of the internet of things (IoT) connected cameras, the increasing societal need for rapid and equitable security, and the demand for accurate real-time intelligent surveillance has never been higher. With the recent emergence of the artificial intelligence of things (AIoT), some surveillance solution providers have started adding basic forms of artificial intelligence to their systems. However, their methods are still naive and unable to enhance security in a truly meaningful way. This is because, while much research is conducted on tasks that would benefit surveillance systems, most works focus on algorithmic improvements in a lab environment instead of paying attention to factors that are prevalent in real-world scenarios. Most research focuses on a single algorithm and how to tweak it to get the best possible results on readily available datasets that often do not reflect a real surveillance environment. Few works explore how different algorithms affect the performance of other downstream algorithms in multi algorithm systems. Few still explore the effects of noise (both data derived and the system produced) in end-to-end accuracy.

Beyond this, real-world intelligent surveillance necessitates real-time performance. The cognitive abilities of advanced artificial intelligence are helpful if they can be provided to security personnel quickly enough to take appropriate action before it is too late. Current IoT methods often use cloud computing, which can introduce latency and privacy concerns, or they require custom sensors with high processing power. Embodiments offer a solution to utilize existing IoT sensors, minimizing the need for expensive infrastructure upgrades and reliance on cloud processing. Embodiments are device agnostic; As long as video from the camera can be accessed, the AI system can provide intelligence.

The present disclosure describes an end-to-end scalable, intelligent video surveillance system for the AIoT and able to perform high-level cognitive tasks in real-time while achieving state-of-the-art results. Embodiments provide state-of-the-art AI to real-world surveillance applications while respecting ethical concerns and performing high-level cognitive tasks in real-time. Embodiments take advantage of the prevalence of cameras in the IoT and uses localized servers to integrate with existing IoT camera ecosystems, facilitating processing on the edge. Embodiments revolutionize the surveillance landscape to bring more effective, intelligent, and equitable security to the field, resulting in safer and more secure communities without requiring people to compromise their right to privacy.

Figure 1:
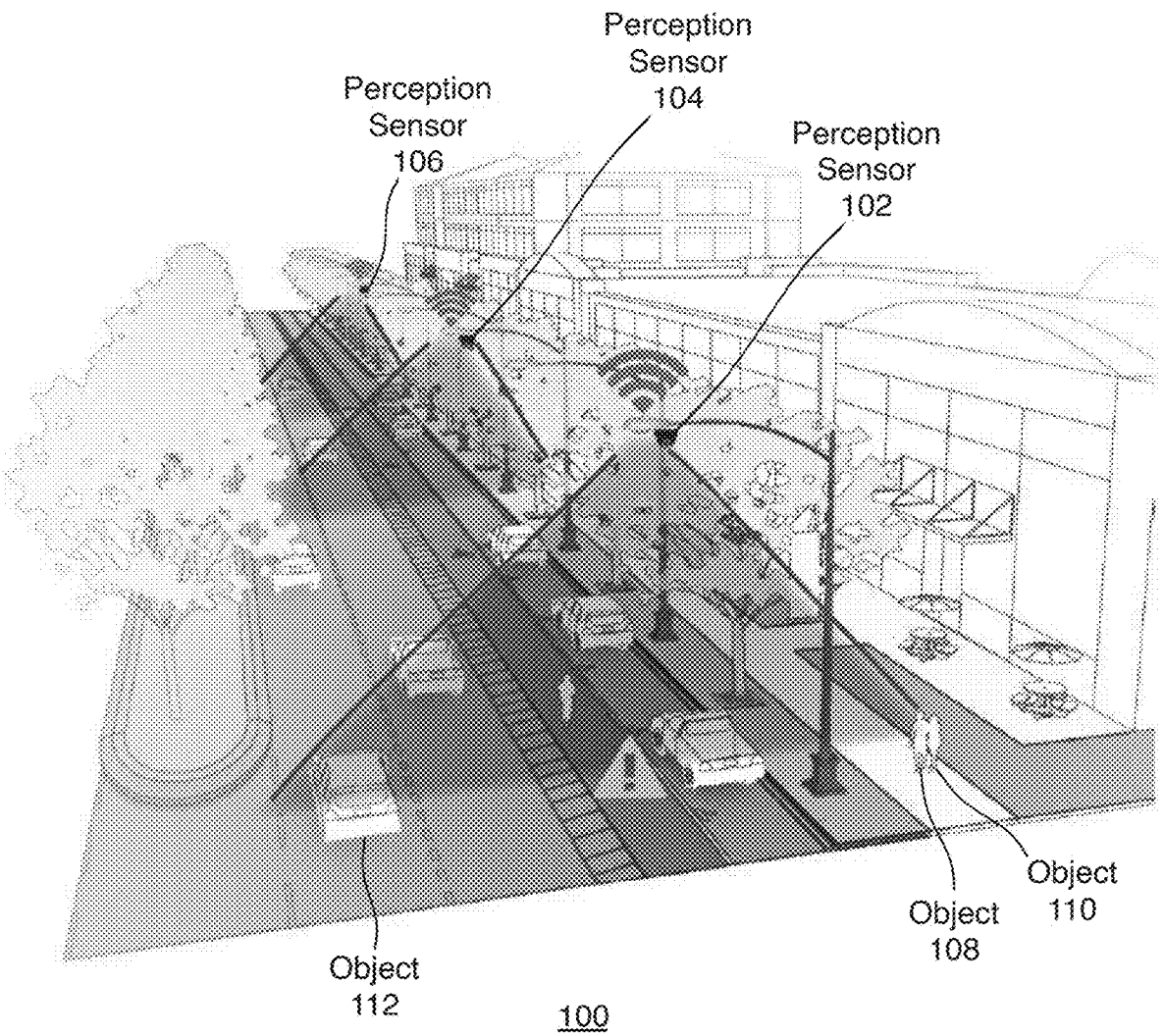
FIG. 1 is a block diagram of an example environment for providing scalable intelligent video surveillance for the artificial intelligence of things.

FIG. 1 is a block diagram of an example environment 100 for providing scalable intelligent video surveillance for the artificial intelligence of things. The environment 100 shows an example of a system with an integration of edge video analytics applied to a community fabric. Shown are multiple perception sensors 102, 104, and 106, which may include 360-degree cameras, for example. Also shown are example objects 108, 110, and 112, which may include people, vehicles, buildings, trees, seating, etc. Such objects may be mobile or stationary. There may be any number of and types of perception sensors and objects in the environment 100. In various embodiments, the environment 100 may not have all of the components shown and/or may have other elements including other types of elements instead of, or in addition to, those shown.

As described in more detail herein, a system such as an artificial intelligence system accesses and/or controls the perception sensors 102, 104, and 106 in the environment 100 and retrieves a sequence of images (e.g., video footage) of objects such as people in the environment 100 from the perception sensors 102, 104, and 106. The system analyzes the video footage to perform intelligent video surveillance for the artificial intelligence of things, including detection and identification of anomalies in the environment 100. Such anomalies may include unusual behaviors or scenarios that may pose heightened risk or danger to people, property, or infrastructure in the environment 100. For example, such detection of anomalies helps to address a variety of problems, including overcrowding, infrastructure attacks, etc. The environment 100 may also be referred to as the target environment 100, which is under surveillance, and the objects in the target environment 100 being analyzed by the system may be referred to as target objects, which are under surveillance. Example embodiments directed to the detection and identification of anomalies are described in more detail herein.

Figure 2:
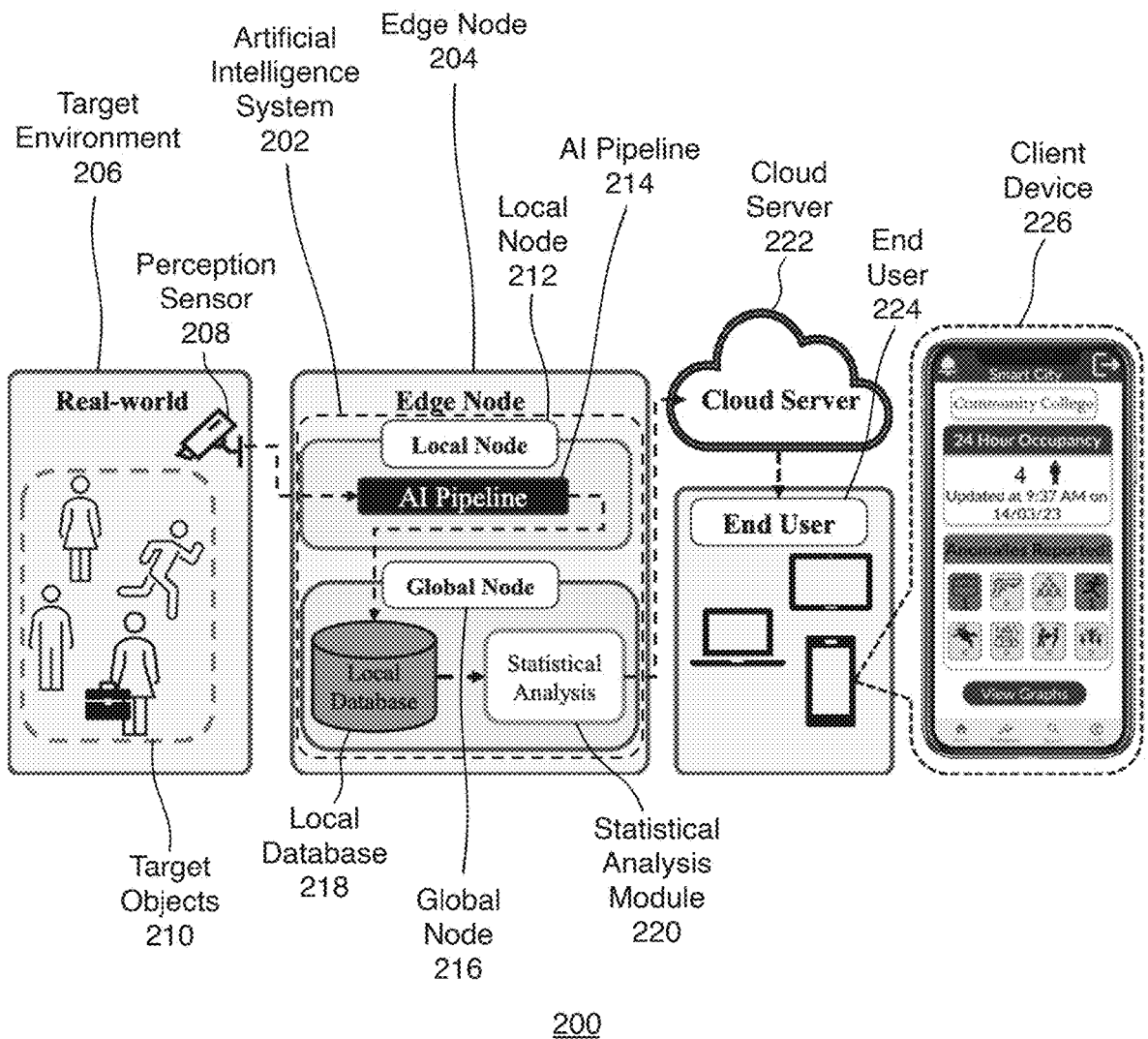
FIG. 2 is a block diagram of an example environment 200, including an artificial intelligence system at an edge node, for providing scalable intelligent video surveillance for the artificial intelligence of things.

FIG. 2 is a block diagram of an example environment 200, including an artificial intelligence system at an edge node, for providing scalable intelligent video surveillance for the artificial intelligence of things. Shown is an AI system 202, which may be used to implement the system referred to in FIG. 1. Also shown are an edge node 204, a target environment 206, a perception sensor 208, and target objects 210. The target environment 206 may represent the target environment 100 of FIG. 1. The perception sensor 208 may represent any one or more of the perception sensors 102, 104, 106, etc. of FIG. 1. Similarly, the target objects 210 may represent any of the possible target objects of FIG. 1. Also shown are a local node 212 that includes an AI pipeline 214, a global node 216 that includes a local database 218 and a statistical analysis module 220, a cloud server 222, an end user 224, and a client device 226.

As shown, in various embodiments, the AI system 202 resides at the edge node 204. The edge node 204 is configured to receive video footage of the target environment 206 from one or more perception sensors, such as the perception sensor 208. In various embodiments described herein, the edge node 204 is local to the target environment 206 and local to the one or more perception sensors (e.g., the perception sensor 208, etc.). For clarification, the environment 200 may also be referred to as the system environment 200, which provides intelligent video surveillance, to distinguish the system environment 200 from the target environment 206, which is under surveillance.

In various embodiments, one or more perception sensors may include one or more image sensing perception sensors or cameras, 360-degree cameras, radar detectors, light detection and ranging (Lidar) cameras, and/or ultrasonic cameras, or any combination thereof. The system may utilize image sensing perception sensors or cameras and/or infrared (IR) perception sensors or cameras and/or radar perception sensors or cameras.

The AI system 202 includes the local node 212 and the global node 216. The local node 212 is associated with the edge node 204 and includes the AI pipeline 214, which is configured to process the video footage received from the one or more perception sensors (e.g., the perception sensor 208, etc.). The AI system 202 also includes a local node module (shown in FIG. 16) that is associated with the local node 212. The local node module includes any software components that are utilized to implement embodiments associated with the local node 212. For example, such software components may include any software associated with the AI pipeline 214, etc. Example embodiments directed to the local node module are described in more detail herein.

The global node 216 is also associated with the edge node 204 and is configured to process the video footage received from the AI pipeline 214 and configured to send processed anomaly information to the cloud server 222. The global node 216 includes the local database 218 and the statistical analysis module 220. The AI system 202 also includes a global node module (shown in FIG. 16) that is associated with the global node 216, where the global node module includes any software components that are utilized to implement embodiments associated with the global node 216. For example, such software components may include any software associated with the local database 218, the statistical analysis module 220, etc. Example embodiments directed to the global node module are described in more detail herein.

The local database 218 may store video footage, metadata associated with the target environment 206, the target objects 210, the perception sensor 208 and other perception sensors, as well as local and global AI training information for the AI system 202, etc. In various embodiments, the AI system 202 of the edge node 204 includes AI technologies that are trained globally for environments in general and trained locally for the target environment 206. For example, such AI technologies may be trained to analyze surveillance information using global or general techniques and factors that may apply to multiple target environments (e.g., over-crowding of streets, unusual weather patterns, etc.). Such AI technologies may be trained to analyze surveillance information using local or specific techniques and factors that apply uniquely to a particular target environment such as target environment 206 (e.g., overcrowding of a street particular street based on attributes of the particular street in the target environment 206, unusual weather patterns for the particular microclimate of the target environment 206, etc.). In various embodiments, the AI system 202 learns what is normal and what is abnormal in the particular surroundings of the target environment 206, where perception sensors (e.g., cameras, etc.) are located. As a result, the AI system 202 may not only detect the presence of a given anomaly, but may also identify the nature and/or type of anomaly that is specific to the local target environment 206 (e.g., over-crowding, flooding, etc.), which helps to ensure public safety. Example embodiments directed to the training of the AI system 202 are described in more detail herein.

The statistical analysis module 220 performs intelligent analysis on the video footage to detect and identify anomalies in the target environment 206. In various embodiments, the AI system 202 receives the video footage of the target environment 206 from the one or more perception sensors (e.g., the perception sensor 208, etc.). The AI system 202 observes the one or more target objects 210 in the video footage of the target environment 206 in real time. The AI system 202 detects at the edge node 204 one or more anomalies in the target environment 206 based on the observing of the one or more target objects 210 in real time, where the one or more anomalies are specific to the target environment 206. Performing these operations locally at the edge node 204 in real time with minimal to no latency is advantageous over conventional systems that rely on operations in the cloud, which have inherent latency issues. Example embodiments directed to the detection and identification of anomalies and any associated processing of anomaly information are described in more detail herein.

In various embodiments, the target environment 206 is a public environment, and may include environments such as a street in a town or city, a public park, the exterior and/or interior of a municipal building, public campus, etc. In various embodiments, the target environment 206 may also be a private environment, and may include environments such as the exterior and/or interior of a private building, private campus, business environment, home environment, etc.

In various embodiments, the AI system 202 detects the one or more anomalies in the target environment 206 without collecting personal identification information. For example, the AI system 202 need not determine any personally identifiable information of any individuals being monitored in order to detect and identify anomalies in a given target environment. In other words, the AI system 202 need not use facial recognition to detect and identify anomalies in a given target environment. This ensures the privacy of individuals.

In various embodiments, the system environment 200 is a situational awareness system that includes legacy components for monitoring the target environment 206. For example, in various scenarios, components such as perception sensors, cloud servers, client devices, software components, etc., may include be existing, outdated equipment, devices, and software components that are limited in capabilities, new, cutting-edge equipment, devices, and software components with varying enhanced capabilities, or any combination thereof.

The various system components shown in FIG. 2 may communicate directly or indirectly with the AI system 202. The AI system 202 may communicate with various system components via any suitable communication network such as a Bluetooth network, a Wi-Fi network, wide area network (WAN), local area network (LAN), the Internet, etc.

For ease of illustration, FIG. 2 shows one block for various components such as the perception sensor 208. Each of the components shown may represent multiple perception sensors, nodes, databases, modules, servers, client devices, etc. In other embodiments, the environment 200 may not have all of the components or elements shown and/or may have other elements including other types of elements instead of, or in addition to, those shown herein.

While the AI system 202 performs embodiments described herein, in other embodiments, any suitable component or combination of components associated with the AI system 202 or any suitable processor or processors associated with AI system 202 may facilitate performing the embodiments described herein.

The following describes additional embodiments associated with the system environment 200 of FIG. 2. In various embodiments, the AI system 202 provides end-to-end video analytics for real-time situational awareness. The AI system 202 integrates with existing perception sensors (e.g., cameras, etc.) through localized servers for edge processing and is structured in three segments: the edge, the cloud, and user devices. As indicated herein, the algorithmic core of the technology is separated into two conceptual systems: the local nodes containing the algorithmic pipeline of each camera, and the global node that handles all processing that requires an understanding of multiple camera perspectives. After edge processing, data is sent to the cloud for communication and service management. Users may access via a mobile application that provides real-time alerts for potential security concerns. Embodiments are designed with privacy-first principles. For example, the AI system 202 does not store personally identifiable information or employ invasive facial recognition or gait detection techniques. The anomaly detection algorithm utilizes pose and locational information, disregarding identity information to ensure that the technology focuses on actions, not individuals. This approach eliminates bias based on race, ethnicity, gender, age, and socio-economic factors, ultimately reducing conflicts between authorities and marginalized communities. Embodiments provide an end-to-end artificially intelligent surveillance system capable of state-of-the-art analytics not currently available on the market.

FIG. 3 is a flow chart for detecting anomalies in a target environment. Referring to both FIGS. 2 and 3, a method is initiated at block 302, where a system such as the AI system 202 receives, at the edge node 204, video footage of the target environment 206 from one or more perception sensors, such as perception sensor 208. In various embodiments, the edge node 204 is local to the target environment 206 and the one or more perception sensors (e.g., perception sensor 208).

As indicated above, the edge node 204 includes the local node 212 and the global node 216. Also, the local node 212 includes the AI pipeline 214, which is configured to process the video footage received from the one or more perception sensors, such as perception sensor 208. In various embodiments, the local node 212 contains the algorithmic pipeline of each of the perception sensors associated with the target environment 206. Also, the global node 216 is configured to process the video footage received from the AI pipeline 214 and configured to send processed anomaly information to the cloud server 222. In various embodiments, the global node 216 handles all processing associated with multiple perspectives of different perception sensors. For example, the global node 216 may monitor and track a given object (e.g., person, vehicle, etc.) over multiple perception sensors, and may aggregate data to characterize location, pose, movement, and gait information associated with the object. Example embodiments directed to operations of the local node and the global node are described in more detail below in connection with FIGS. 9 and 10, for example.

At block 304, the system 202 observes the one or more target objects 210 in the video footage of the target environment 206 in real time. Example embodiments directed to the observing of target objects are described in more detail below in connection with FIGS. 5 and 6, for example.

At block 306, the system 202 detects at the edge node 204 one or more anomalies in the target environment 206 based on the observing of the one or more target objects 210 in real time, where the one or more anomalies are specific to the target environment 206. As indicated above, in various embodiments, the target environment 206 is a public environment. Also, in various embodiments, the AI system 202 detects the one or more anomalies in the target environment 206 without collecting personal identification information.

As indicated herein, in addition to the AI system 202 detecting an anomaly, the AI system 202 may also identify the nature and/or type of anomaly. For example, the AI system 202 may determine if a given anomaly involves overcrowding, infrastructure attacks, adverse weather conditions such as flooding, high winds, etc. With such anomaly information, the AI system 202 may issue warnings or alerts directly to interested parties and/or via the cloud. Example embodiments directed to the detection of anomalies are described in more detail below in connection with FIGS. 4, 5, and 6, for example.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time. Also, some embodiments may not have all of the steps shown and/or may have other steps instead of, or in addition to, those shown herein.

Figure 4:
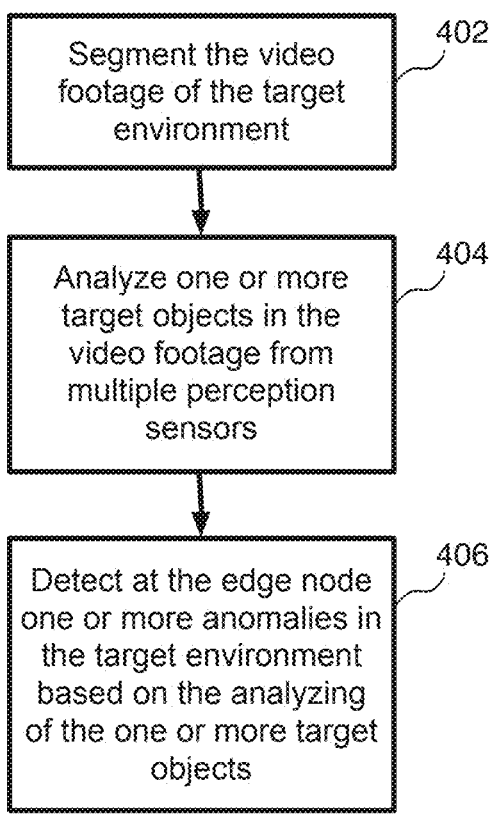
FIG. 4 is a flow chart for detecting anomalies in a target environment based on analysis of one or more target objects.

FIG. 4 is a flow chart for detecting anomalies in a target environment based on analysis of one or more target objects. Referring to both FIGS. 2 and 4, a method is initiated at block 402, where a system such as the AI system 202 segments the video footage of the target environment 206. As indicated above, the video footage includes video footage from multiple perception sensors, such as perception sensor 208.

Figure 5:
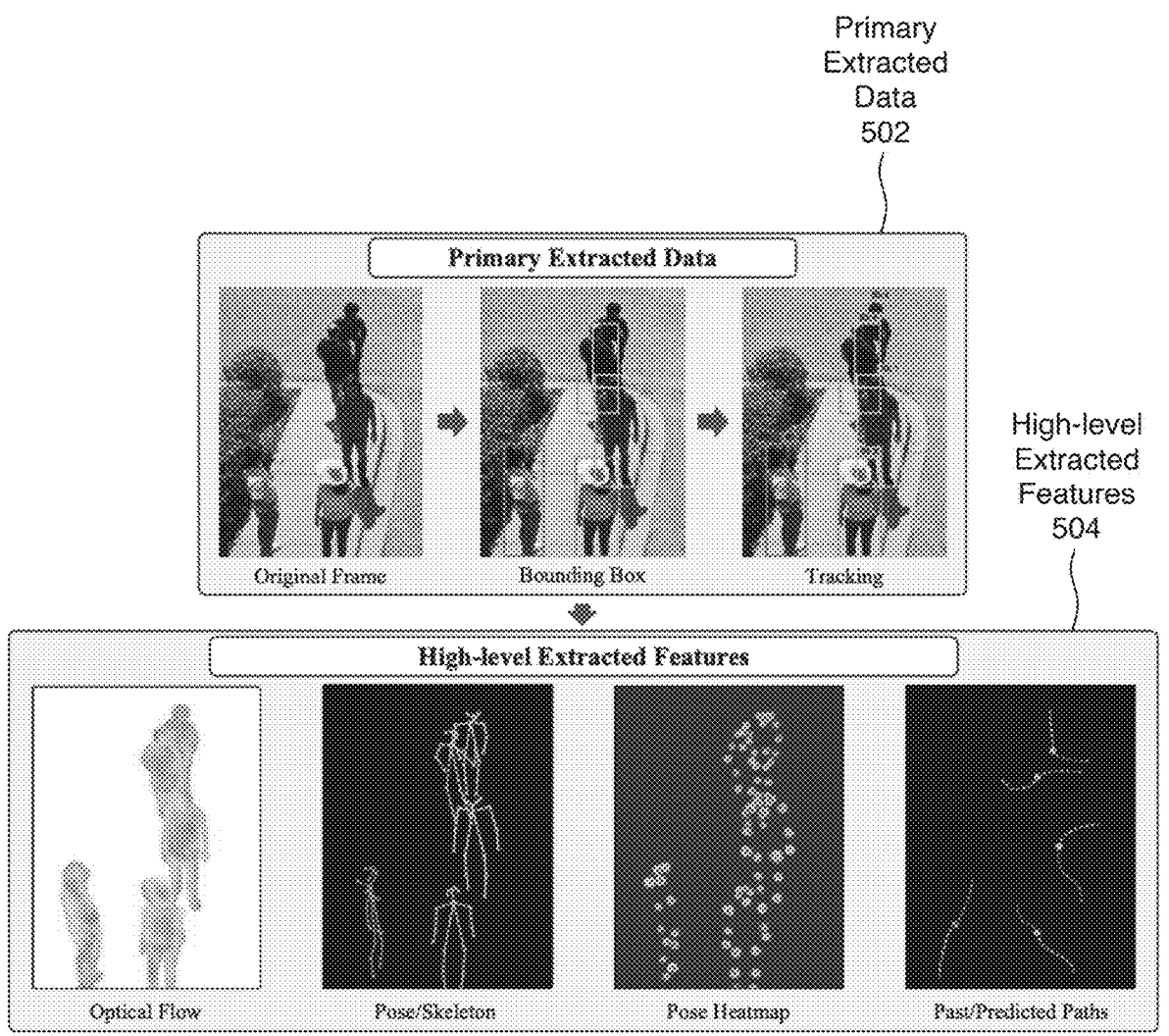
FIG. 5 is an example series of images showing primary extracted data and images showing high-level extracted features.

FIG. 5 is an example series of images showing primary extracted data and images showing high-level extracted features. As shown, primary extracted data 502 includes an example original frame with objects (people), an example bounding box frame, where objects of the original frame are segmented, and a tracking frame, where segmented objects of the original frame are tracked and monitored. High-level extracted features 504 include an example optical flow image, an example pose and skeleton image, an example pose heatmap image, and an example past path and predicted path image.

In various embodiments described herein, the AI system provides advanced anomaly detection algorithm for smart video surveillance systems that may be deployed in the real world by addressing growing market needs for more intelligent systems. The following embodiments address various challenges to improve the efficacy of real-world anomaly detection. The AI system address high-dimensional multi-representative identity-neutral feature visual embedding. The AI system factors in a set of efficacious non-identifiable features, including pose, heatmaps, optical flow, and previous/future path to tackle privacy-related challenges for anomaly detection. Moving from raw pixel data to sets of features eliminates environmental noise and reduces the input dimensionality. Removing pixel data may lead to a loss of information. To mitigate this issue, the AI system builds an enriched feature map. The AI system utilizes feature embedding models that in turn utilize autoencoders to facilitate the effective transfer of input features to the latent space and generate comprehensive feature maps that serve as tokens. Subsequently, the anomaly detection architecture employs these embedded features to make the final decision as to the presence of an anomaly in the target environment.

In various embodiments, the anomalous events may involve a single person or intricate interactions between multiple individuals or objects. For instance, a person passing out is a case of a single-person anomaly that may occur, while a suspicious exchange of substances is a case of group anomalous behavior. In the case of group anomalies, the social interactions between people, and between people and people/objects may also give the model valuable information for detecting anomalous events. To address this gap, the AI system incorporates social interactions into input features when generating latent space embeddings. Graphs serve as a powerful tool for capturing interactions between people themselves, and people and objects, enabling the models to learn this high-level information.

Referring still to FIG. 4, at block 404, the AI system 202 analyzes the one or more target objects 210 in the video footage from the multiple perception sensors, where the video footage provides multiple perspectives of the one or more target objects 210 in the target environment 206.

At block 406, the AI system 202 detects at the edge node 204 the one or more anomalies in the target environment 206 based on the analyzing of the one or more target objects 210 in the target environment 206.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time. Also, some embodiments may not have all of the steps shown and/or may have other steps instead of, or in addition to, those shown herein.

FIG. 6 is a flow chart for detecting anomalies in a target environment based on computations of pose information, movement information, and/or gait information. Referring to both FIGS. 2 and 6, a method is initiated at block 602, where a system such as the AI system 202 detects the one or more target objects 210 in the video footage. As indicated above, the video footage includes video footage from/captured by multiple perception sensors, such as perception sensor 208.

At block 604, the AI system 202 computes one or more of pose information, movement information, and gait information associated with each of the target objects 210 associated with each of the target objects 210. For example, such pose information, movement information, and gait information may be included with the high-level extracted features 504 of FIG. 5 and/or may be derived from the primary extracted data of FIG. 5.

At block 606, the AI system 202 detects at the edge node 204 the one or more anomalies in the target environment 206 based on the computing of the pose information, the movement information, and/or the gait information associated with each of the target objects 210.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time. Also, some embodiments may not have all of the steps shown and/or may have other steps instead of, or in addition to, those shown herein.

The following embodiments are directed to a real-world multi-context anomaly detection dataset. In general, great datasets are available to the research community. However, they do not measure up regarding real-world execution and evaluation. As such, creating a real-world dataset and leveraging its opportunities is critical. Embodiments described herein provide a real-world, multi-environment, and multi-modal anomaly detection dataset. The number, type of cameras, and the recording frames per second (FPS) ensure that sufficient learnable samples are available. To create this dataset, the AI system may be trained with actors that represent a variety of anomalous behaviors. Subtle anomalies, including but not limited to exchanging illegal substances, stalking, following a person, and storing an anomalous object, as well as widespread irregularities such as fighting, falling, and pushing, are covered through the collection of the dataset.

Viewpoint variations greatly help with training and assessing the models' generalizability and overall performance. To cover the domain shift between various environments and to enable interdomain generalizability assessment and training, the AI system may be trained with videos from different environments. For example, for each environment, two different locations may be selected. While the videos from a first location may be used for normal training and evaluation, the videos from a second location may be used for generalizability, domain shift assessment, and online learning evaluation. In some embodiments, the videos may be recorded approximately with an equal number of frames in each location (e.g., approximately 6 million in each location, 1 million per viewpoint, etc.). In some scenarios, there may be three radically different setups (e.g., parking lots, park and recreational centers, and bus stops to include various contexts). The number of frames collected may significantly exceed the quantity currently available within all available datasets.

To analyze the discriminative power of the dataset for anomaly detection, a novel metric may be defined, the signed difference of means (S-DoM). The S-DoM may quantify a feature's discriminative power for detecting anomalies. A larger S-DoM shows the anomalous behavior in the validation set drastically differs from normal behavior in training set while the normal behavior in training and validation sets are similar. This metric may be applied to various features such as pose, trajectory, etc. By doing so, the AI system may analyze the effectiveness of different feature sets for anomaly detection and assess the quality of a dataset.

The following embodiments are directed to semi-supervised transformer-based sequence learning for anomaly detection. Natural language processing (NLP) methods are powerful tools with various applications across various industries. Their intrinsic ability to reason and extract long-term dependencies has been widely recognized. Anomaly detection necessitates the ability to reason and possess awareness akin to the generative pre-trained transformer. Attention mechanisms are designed to focus on more informative parts of the input allowing the model to learn more effectively. Anomalous behaviors usually do not drastically differ from normal behavior regarding a person's body movement. In addition, embodiments utilize temporal attention to help the model focus on more informative time steps for detecting anomalies instead of confusing the model with a large amount of data provided by the input sequence. Furthermore, as transformers revolutionized NLP applications, vision transformers also have shown incredible performance in tasks such as object detection. Due to the ability of transformers to effectively capture long-term dependencies and to build internal reasoning models from the input data, embodiments adopt them for anomaly detection. Transformers' high parallelization and efficiency make them a well-suited design choice for time-sensitive applications.

Figure 7:
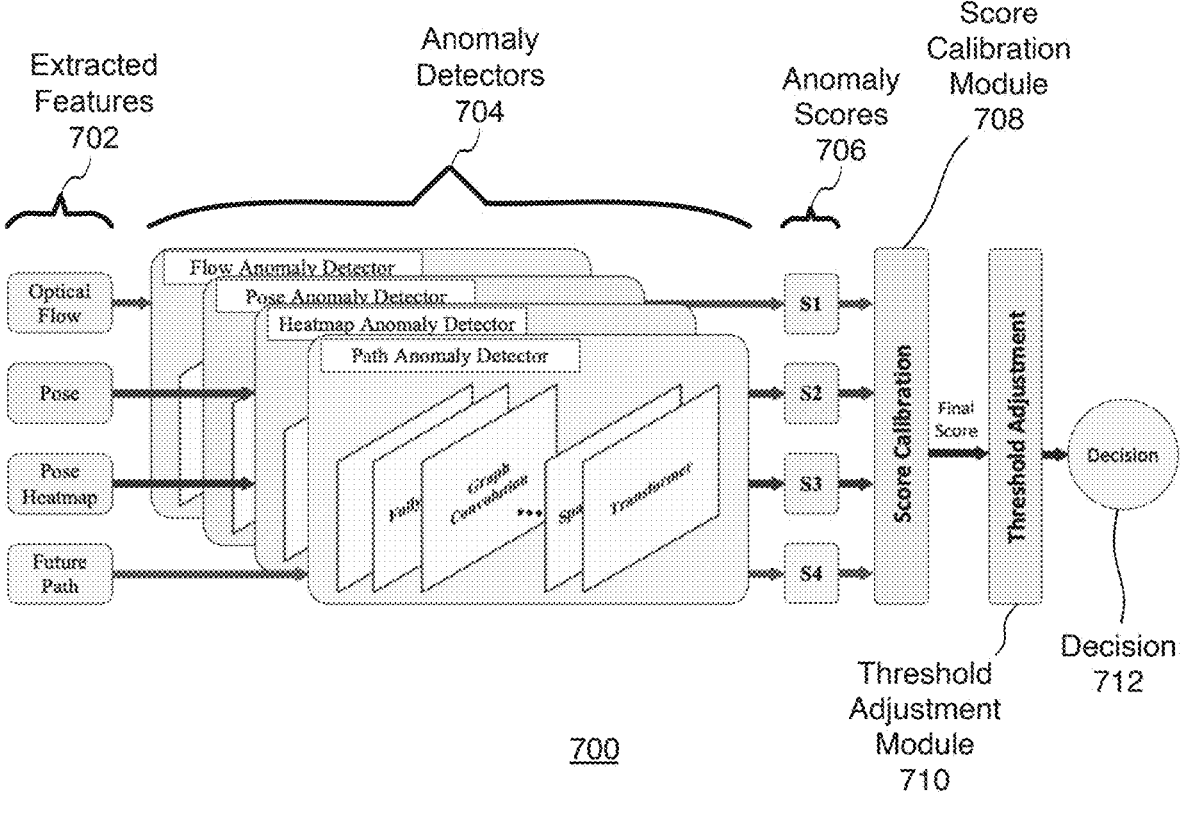
FIG. 7 is a block diagram of an example architecture involving a multi-branch approach for detecting anomalies in a target environment.

FIG. 7 is a block diagram of an example architecture 700 involving a multi-branch approach for detecting anomalies in a target environment. Shown are four branches each having associated extracted features 702 and anomaly detectors 704. For example, in various embodiments, one branch is a flow branch involving optical flow extracted features and a flow anomaly detector. One branch is a pose branch involving pose extracted features and a pose anomaly detector. One branch is a heatmap branch involving pose heatmap extracted features and a heatmap anomaly detector. One branch is a path branch involving future path extracted features and a path anomaly detector.

The anomaly detectors 704 output respective anomaly scores 706 (labeled S1, S2, S3, and S4). The anomaly detectors 704 output and feed the anomaly scores 706 into a score calibration module 708. The score calibration module 708 outputs and feeds a final anomaly score into a threshold adjustment module 710. The threshold adjustment module 710 outputs a decision 712 as to whether an anomaly in the target environment is present. In other embodiments, the architecture 700 may not have all of the components or elements shown and/or may have other elements including other types of elements instead of, or in addition to, those shown herein.

In various embodiments, each anomaly score Si is an anomaly score calculated based on each feature. The score calibration module combines these scores from different branches and produces the final anomaly score. Based on the deployment environments and user feedback, the threshold is adjusted, and the final decision is made.

In various embodiments, the multi-branch approach uses separate branches for different features and uses a calibration module to effectively combine the anomaly scores. This multi-branch approach may stress hardware resources but is a starting point for a baseline design, allowing the assessment of each feature and its effectiveness in real-world scenarios. Alternatively, in some embodiments, a unified multi-modal approach may process all modalities simultaneously, providing a solution to this issue as described below in connection with FIG. 8, for example.

Figure 8:
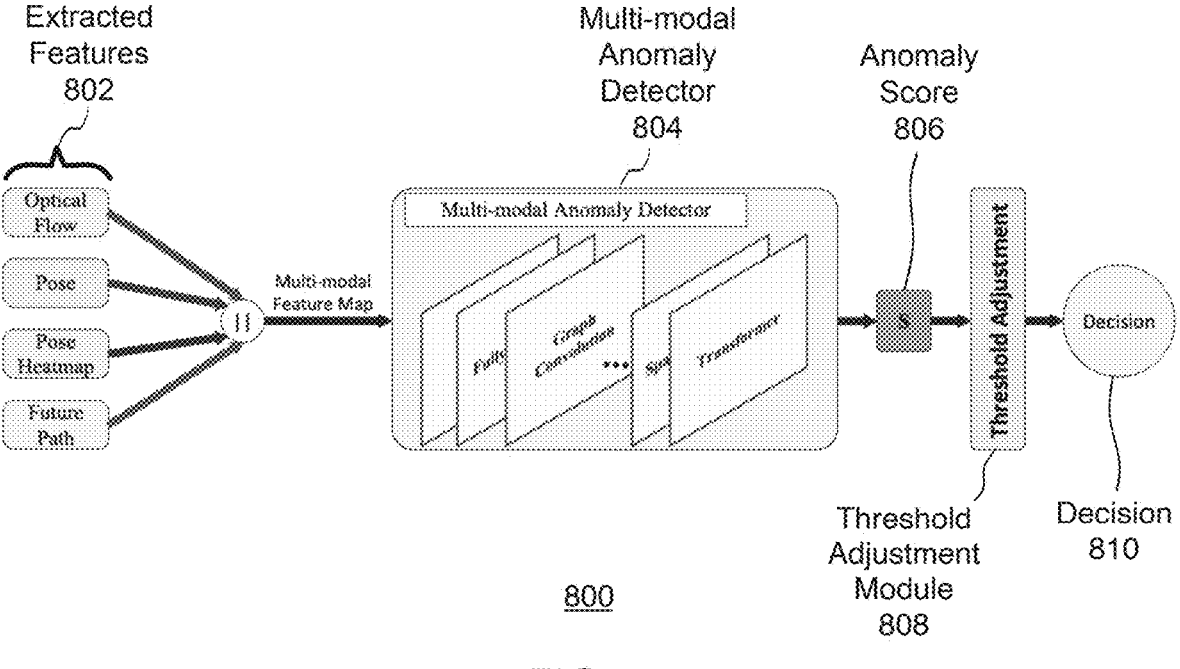
FIG. 8 is a block diagram of an example architecture involving a multi-modal approach for detecting anomalies in a target environment.

FIG. 8 is a block diagram of an example architecture 800 involving a multi-modal approach for detecting anomalies in a target environment. Shown are extracted features 802 and a multi-modal anomaly detector 804. In various embodiments, the extracted features 802 include optical flow extracted features, pose extracted features, pose heatmap extracted features, and future path extracted features.

In various embodiments, the system generates a multi-modal feature map that is inputted or fed into the multi-modal anomaly detector 804. The multi-modal anomaly detector 804 outputs and feeds an anomaly score 806 (labeled S) into a threshold adjustment module 808. The threshold adjustment module 808 outputs a decision 810 as to whether an anomaly in the target environment is present. In other embodiments, the architecture 800 may not have all of the components or elements shown and/or may have other elements including other types of elements instead of, or in addition to, those shown herein.

Instead of having multiple branches for each feature, as shown in the architecture 700 of FIG. 7, the architecture 800 embodiment of FIG. 8 concatenates the features and feeds them to the multi-modal anomaly detector 804. A final anomaly score Sis fed to the threshold adjustment module 808, which makes the final decision as to the presence of an anomaly in the target environment.

In various embodiments, training and evaluation for each model may be conducted in four different setups: normal, cross-evaluation and optimization, changing frames per second (FPS) evaluation and optimization, and changing window size. These tests may use clean and noisy annotations to assess real-world performance. On the other hand, because of the context-specific nature of anomaly detection, certain behaviors may be considered normal in a specific environment but anomalous in others. This challenge necessitates that the designed anomaly detection method be able to adapt to environmental factors. The new dataset enables online learning assessment and training, presenting a practical solution for alleviating this problem. Exhaustive optimization is may be used for online learning as inferencing and updating the model in real-time on limited resources is challenging. The unified architecture may optimize resource usage. Continuous learning may be controlled to avoid overfitting, underfitting, and forgetting previously learned patterns. Finding the appropriate architecture and hyperparameters for continuous learning may involve extensive experimentation on factors such as the time window, amount of data, epochs, and learning rate in the deployed system. The final model outputs an anomaly score to quantify abnormality, and a threshold may be set for decision-making in the real world. Embodiments may use moving averages, seasonality, and machine learning techniques to determine an optimal threshold for a given environment.

The following embodiments are directed to metrics for assessing anomaly detection reliability and resiliency in the real-world. Real-world anomaly detection presents a challenge due to the absence of standardized evaluation metrics. Most works in this field report metrics such as area under the curve of the receiver operating characteristic (AUC-ROC). AUC-ROC is the area under the curve when plotting the true positive rate (TRP) over the false positive rate (FPR) over various thresholds. This metric is specific to binary classification, such as determining if a video does or does not contain anomalous behavior. Generally, a higher AUC-ROC indicates that the model is better at separating inputs into their corresponding classes. The ROC curve itself also helps give insight into the trade-off between TPR and FPR at different thresholds. However, AUC-ROC is not indicative of the final decisions of a model. The metric reports a final calculated number, and concluding useful information about the actual amount of false negative rate (FNR), when an anomaly is classified as normal is almost unfeasible. FNR is particularly important for real-world applications since the cost associated with not detecting anomalous behavior is high. Embodiments described herein may utilize a new metric referred to as FR5. FR5 may be defined as the rate of false positives that arise when the threshold is calibrated to achieve a false negative rate of 5%. This metric emphasizes the importance of false negative cases and their associated cost. False negative rates above 5% are often considered problematic and unacceptable. Therefore, embodiments described herein may establish an upper bound for the false positive rate at 5%.

The following embodiments are directed to system enhancement, which provide seamless integration into legacy video surveillance infrastructure. In various embodiments, software components associated with AI pipeline are written in C++, which is a resource-efficient language that is still agile enough to support the rapid integration of technological advancements. The entirety of the pipeline, including the pipelining, multi-threading, multi-processing, communications, data streaming, and inference code may be written in C++ for the deployment prototype. This is beneficial as cost and scalability are two of consumers' most significant concerns when adopting new technology. In some embodiments, the AI pipeline may be written in Python for rapid prototyping and development. While ideal for conducting research, it is computationally inefficient and dramatically limits the scalability, and thus the cost-effectiveness, of the system. Even though the pipeline takes advantage of both spatial and temporal parallelism through numerous batching strategies and deep pipelining, the inherent inefficiency of the Python language will always hold it back. As such, in various embodiments, C++ is used.

In various embodiments, the AI system operates with application programming interfaces (APIs) in order to integrate into the workflow of end users and provide them with the analytics and insights produced. As most video surveillance systems utilize virtual machines (VMS), the AI system may utilize an open API based on a leading industry standard. This ensures seamless integration into customers' existing surveillance infrastructure and serve as a milestone for measuring the project's progress.

In various embodiments, the AI system may operate with a mobile application that can provide alarms and notifications, and analytics. The mobile application may be modular and customized for each consumer, so they can quickly receive required analytics without additional noise. Consumers may receive analytics, notifications, and alarms wherever they are through the mobile application.

The following embodiments are directed to real-world pilots in diverse operational settings. Embodiments utilize datasets that perform in a real-world context. Embodiments integrate into a consumer's existing security ecosystem seamlessly. A single server (or workstation) with a deep-learning capable graphics processing unit (GPU) is additional hardware that may be used. Embodiments may reside on a server, streaming data from the consumer's existing camera infrastructure and sending analytics to the customer through an open API or mobile application. Embodiments may be applied to a public transit station, such as a bus stop or light rail. Embodiments may also be applied to lower traffic yet highly vulnerable assets, such as power substations and communications infrastructure. Embodiments may also be applied to industrial warehouses, commercial structures, financial institutions, and parking lots. These diverse settings ensure that the data collected from each is rich and meaningful with little overlap.

Figure 9:
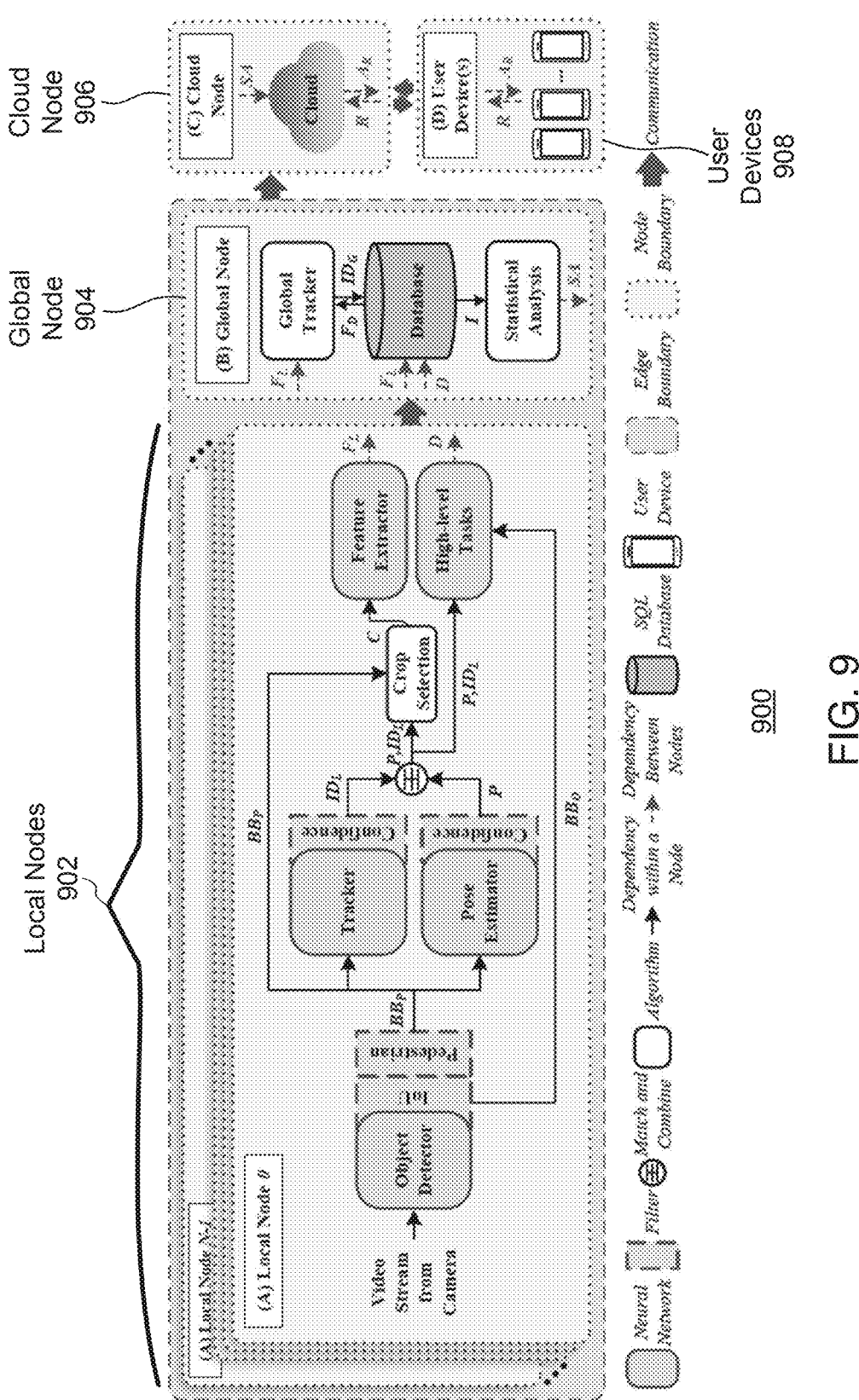
FIG. 9 is a block diagram of an example architecture including local nodes and a global node for detecting anomalies in a target environment.

FIG. 9 is a block diagram of an example architecture 900 including local nodes and a global node for detecting anomalies in a target environment. Shown are local nodes 902, a global node 904, a cloud node 906, and user devices 908. Any of the local nodes 902 may be used to implement the local node 212 of FIG. 2. The global node 904 may be used to implement the global node 216 of FIG. 2. The cloud node 906 may be used to implement the cloud server 222 of FIG. 2. Any of the user devices 908 may be used to implement the client device 226 or any of the other client devices shown in FIG. 2. In other embodiments, the architecture 900 may not have all of the components or elements shown and/or may have other elements including other types of elements instead of, or in addition to, those shown herein.

In various embodiments, N local nodes are connected to a single global node on the edge. The final analyses are transferred to the cloud node to feed the application on the user device. Multiple edges may be connected to the cloud, though this figure shows one edge for clarity. $BB_P$, $BB_O$, $ID_L$, P, C, $F_L$, D, $F_D$, $ID_G$, I, SA, R, and $A_R$ refer to bounding boxes for pedestrians, bounding boxes of objects, local identities, poses, person crops that ode, data from the downstream tasks, features from the database, global identities, information from the database, completed statistical analysis, requests from users, and requested attributes respectively.

In various embodiments, the algorithmic core is separated into two systems: the local nodes containing the algorithmic pipeline of each camera and the global node that handles all processing that requires understanding of multiple camera perspectives. These two systems make up the algorithmic core and are the basis on which all higher understanding is achieved. A visual representation of this algorithmic core is shown in FIG. 9.

In various embodiments, a single camera vision pipeline is shown in FIG. 9. The local algorithmic pipeline starts when an image is extracted from the camera. The image is first run through an object detector to locate people, vehicles, animals, and other important objects in the scene. This is important not only because it acts as the basis for the rest of the algorithmic pipeline but also because it can be used for basic situational awareness. Sometimes, just the presence of a certain object in a scene is noteworthy, such as a person in an unauthorized location, a bag left unattended, or the presence of a firearm. Embodiments may use YOLOv5 for this purpose (however, it can be any detector). Note that many objects of interest are not included in the default weights provided by YOLOv5. However, other works have trained the architecture for classes such as firearms, and custom weights may always be trained to match the target application. The locational coordinates of persons are sent to a tracker, where tracklets are created, matching each person with their previous detections in prior images. Some embodiments may utilize the version of ByteTrack without frame similarity. In this configuration, ByteTrack does not perform feature extraction, which results in a notable reduction in computation.

In some embodiments, locational similarity is sufficient for single camera tracking. The tracking allows for understanding how a person moves throughout a scene, which is vital for many surveillance applications. It also allows embodiments to understand which poses belong to which persons over time, which is vital for many high-level tasks that provide much-needed situational awareness. Image crops of the people detected in the image are also sent to a human pose estimator, where two-dimensional pose skeletons are created. Embodiments, may use HRNet for extracting 2D skeletons. Using pose data for higher level tasks has two major benefits over simply using raw pixel data. First, pose data is of much lower dimensionality than pixel data, making it much less computationally expensive and allowing embodiments to function in real-time. Second, pose data helps us remove the appearance-based PII information inherent in pixel data, making it harder for high-level tasks to form unintended biases based on ethnicity, gender, age, or other identity-based metrics. Embodiments may identify subjects based on their poses, in a line of work referred to as gait recognition, though pose-based approaches are more privacy preserving compared to their alternatives.

Embodiments may utilize multi-camera person re-identification. While the tracker tracks people within a single camera, locational information cannot accurately re-identify a person across multiple cameras. For this, the same person crops that are sent to the human pose estimator are also sent to a person re-identification feature extractor, where an abstract feature representation is created for each person. One feature representation is created for each person during a single batch, and when the quality of the representation can be assured, as poor-quality representations are detrimental to accurate multi-camera person re-identification. Embodiments use a feature representation filtering algorithm to verify two qualities for person crops. First, a person crop must contain a high-quality view of the person. To this end, the filter algorithm uses the 2D pose skeleton and verifies that at least 9 keypoints were detected with at least 60% confidence. The filter algorithm looks at the overlap (e.g., intersection of union) of the bounding boxes generated by the object detector. An individual's bound box must have an intersection over union (IoU) of no more than 0.1 with any other person. If those two conditions are met, the person crop is determined to be of high enough quality to produce an adequate feature representation. If more than one crop is deemed suitable for a single person during a 15-frame window, the one with the most confident pose is selected. The features created by the feature extractor are sent to the global node for multi-camera person re-identification. Some embodiments may use OSNet or the like to extract feature representations.

For higher level tasks, to help preserve privacy from a system perspective, sensitive information may be kept on a local machine by executing all high-level tasks on the local node. These tasks have access to the object, tracking, and pose data generated in the previous steps. Since the decision of which high-level tasks are needed is highly application dependent, these tasks need not be part of the algorithmic core, and instead used as an extension to be customized based on intended use. Embodiments may use action recognition and anomaly detection as two common examples of high-level tasks that are highly relevant to intelligent surveillance. For action recognition, embodiments may use PoseConv3D and CTR-CGN, or the like, two state-of-the-art networks that can utilize the 2D human pose skeletons. For anomaly detection, embodiments may use GEPC and MPED-RNN, or the like, which are based on 2D human pose skeletons.

Embodiments may use pixel-based methods for these tasks that achieve superior accuracies than SotA posed-based methods, such as I3D, MVIT, and Stargazer, or the like. Argus is a good example of a system that employs pixel-level information with a subsequent evaluation conducted on a real-world surveillance dataset referred as Meva. However, due to the privacy benefits and the computational benefits of using lower-dimensional pose data, embodiments may use pose-based methods.

Figure 10:
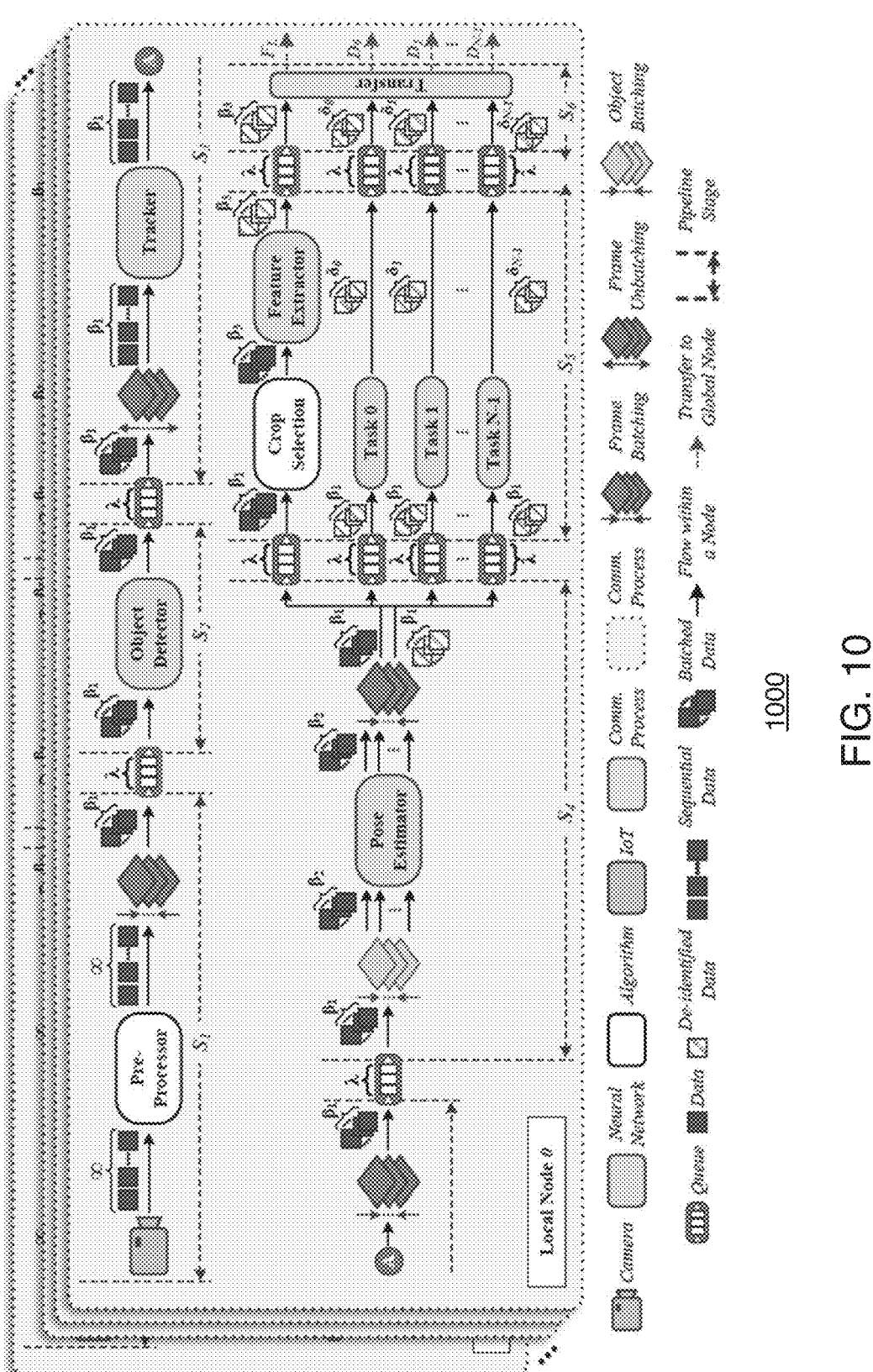
FIG. 10 is a block diagram of an example architecture including local nodes for detecting anomalies in a target environment.

FIG. 10 is a block diagram of an example architecture 1000 including local nodes for detecting anomalies in a target environment. Any of the local nodes of the architecture 1000 may be used to implement the local node 212 of FIG. 2 and/or any of the local nodes 902 of FIG. 9. In other embodiments, the architecture 1000 may not have all of the components or elements shown and/or may have other elements including other types of elements instead of, or in addition to, those shown herein. $\beta$ and $\delta$ refer to different batch sizes. A refers to the queue size. FL and D represent local features and data received from downstream tasks respectively.

Beyond the algorithmic design, the AI system may be analyzed from a system level design and implementation perspective. The local node in particular has a complex system design, as shown in FIG. 10. The global node and cloud are much simpler, as shown in FIG. 9.

The following embodiments are directed to parallelism. A key design objective of is to achieve higher efficiency by balancing throughput and latency. Embodiments use pipelining to take advantage of process parallelism, dividing tasks into six separate stages of a pipeline system (S1; S2; ::::; S6). Each stage is implemented as a separate process, which executes concurrently with other processes as soon as it receives its required input. These stages communicate with each other using queues to utilize memory resources better and enable fast inter-process communication. While pipelining is a well-known technique for optimization, the overhead associated with its implementation means a balance needs to be found. The architecture 1000 of FIG. 10 shows a detailed view of the system design on the local node. Each pipeline stage is separated by a queue with a size limit of A elements, preventing any potential overflow from uneven execution speed between pipeline stages. By default, embodiments use a 2 value of 1. As is common, embodiments offload highly parallel tasks that rely on neural networks (e.g., object detection, pose estimation, feature extraction, and many high-level tasks) to graphics processing units (GPUs) for execution.

In various embodiments, batching is another technique that embodiments may implement to better utilize hardware resources. Generally, batching is able to greatly increase the throughput of a system at the cost of end-to-end latency. However, many high-level tasks (e.g., action recognition, anomaly detection) require multiple video frames worth of input data (often called a window) before they can start processing. As such, the latency that would be incurred by batching input frames is already inherent in these high-level tasks, as long as the frame batch and high-level task window are of the same size. In other words, if a high-level task needs x number of frames before it can start processing, having a batch size of x frames will ensure the task gets all the frames it needs simultaneously, incurring no additional latency for the task. If the window size of the high-level task is larger than the batch size multiple batches will be needed to be processed to receive output from the high-level task. Furthermore, as frame batching ultimately increases the throughput, the end-to-end latency is decreased when compared processing each frame sequentially. While object detection works on entire frames, all other neural networks of the AI system work off individual objects. These objects are batched together before being input to the network, greatly increasing hardware utilization. There may be multiple object batches within a single frame batch, based on how many of the relevant objects are detected in the video. The following embodiments are directed to the local node.

1) $S_1$—Preprocessing: Once the local node receives the video stream from the camera, the preprocessor is responsible for all basic image processing necessary before sending the frames through the algorithmic core. That includes any necessary resizing, frame dropping, and/or color channel reordering. Frame dropping is a dynamic mechanism that ensures the framerate fed to the pipeline matches the throughput of the pipeline. For example, if the frame source (e.g., camera) produces 60 FPS, but embodiments may run at FPS, only every second frame from the source will be passed through preprocessing. After preprocessing, frames are batched in sequential segments of size $\beta_1$. The AI system may set $\beta_1=15$. This is done to balance throughput and latency, as well as to more closely match the window size of the high-level tasks, requiring only two batches to complete before these tasks can produce an output. This is also suitable because most modern security and IoT cameras record video at either 30 or 60 FPS.

2) $S_2$—Object Detection: The batched frames are sent to the object detector, which outputs a list of objects with class labels and bounding box coordinates. Bounding boxes for pedestrians are sent to the tracker, while bounding boxes for other objects are passed through the system for use in high-level tasks and statistical analysis. A crop of each pedestrian from the original frame is passed through to the pose estimator at later stages.

3) $S_3$—Tracking: At the tracker, bounding boxes for pedestrians are unbatched to fit the tracker's sequential operation. The tracker groups the pedestrians and either matches them with previously seen pedestrians or assigns them a unique local ID. Afterwards, the pedestrians are once again batched by frame, back to the original batch size of $\beta_1=15$ frames, and sent to the pose estimator.

4) $S_4$—Pose Estimation: At the pose estimator, the object batching is performed on the person crops, with a batch size of $\beta_2=32$. These batches are fed to the pose estimator, which outputs human pose skeletons for each person crop. Then the pedestrian bounding boxes, person crops, local IDs, and human pose skeletons are once again batched by frame and combined with the object bounding boxes from the object detector. Select data (pedestrian bounding boxes, person crops, local IDs, and pose skeletons) is sent to crop selection and feature extraction, while the de-identified data (pedestrian bounding boxes, object bounding boxes, local IDs, and pose skeletons) is sent to each high-level task as per their request.

5) $S_5$—Feature Extraction and High-level Tasks: Before feature extraction, crop selection filters out low-quality person crops based on bounding box overlap and keypoint confidence. By default, crops with an IoU higher than 0.1 or with 9 or more keypoints with confidence below 60% are discarded. These thresholds can be adjusted to best suit the target application. Out of the remaining crops, a single crop with the highest overall keypoint confidence for each person is selected. The remaining crops are batched, with a dynamic size of $\beta_3$ based on the number of persons in the scene. Feature extractor receives the batch of $\beta_3$ crops. Once features are extracted, they are sent for transfer to the global node. Each high-level task receives data at the granularity of a frame batch with size $\beta_1$, and sends data to the global node at the granularity that task operates at $(\delta_0, \delta_1, \ldots, \delta_n)$. Only deidentified data is sent to the high-level tasks, keeping in line with the ethical concerns. Each high-level task has its own process and works in parallel with other tasks as well as with crop selection and feature extraction in stage 5 of the pipeline.

6) $S_6$—Transfer: Communication is completely decoupled from the pipeline, so once the data is sent, the local node pipeline continues to function as normal without needing a response from the global node. Importantly, no identifiable information is ever sent to the global node, keeping in line with the privacy and ethical concerns.

The following embodiments are directed to the global node. All received data is stored in a relational database on the global node. The matching algorithm compares the received features with existing features in the database over the period T and assigns a global ID based on the results. The default value for Tis set to 1 hour, but this should be changed to suit the needs of the application. An assortment of algorithms performs statistical analysis using the relational database. The analysis is transmitted to the cloud node using APIs provided by the cloud service provider. By default, embodiments may use Amazon Web Services (AWS), but this can be altered based on user/application needs. The cloud (e.g., AWS) receives analyzed data from the global node.

Figure 11:
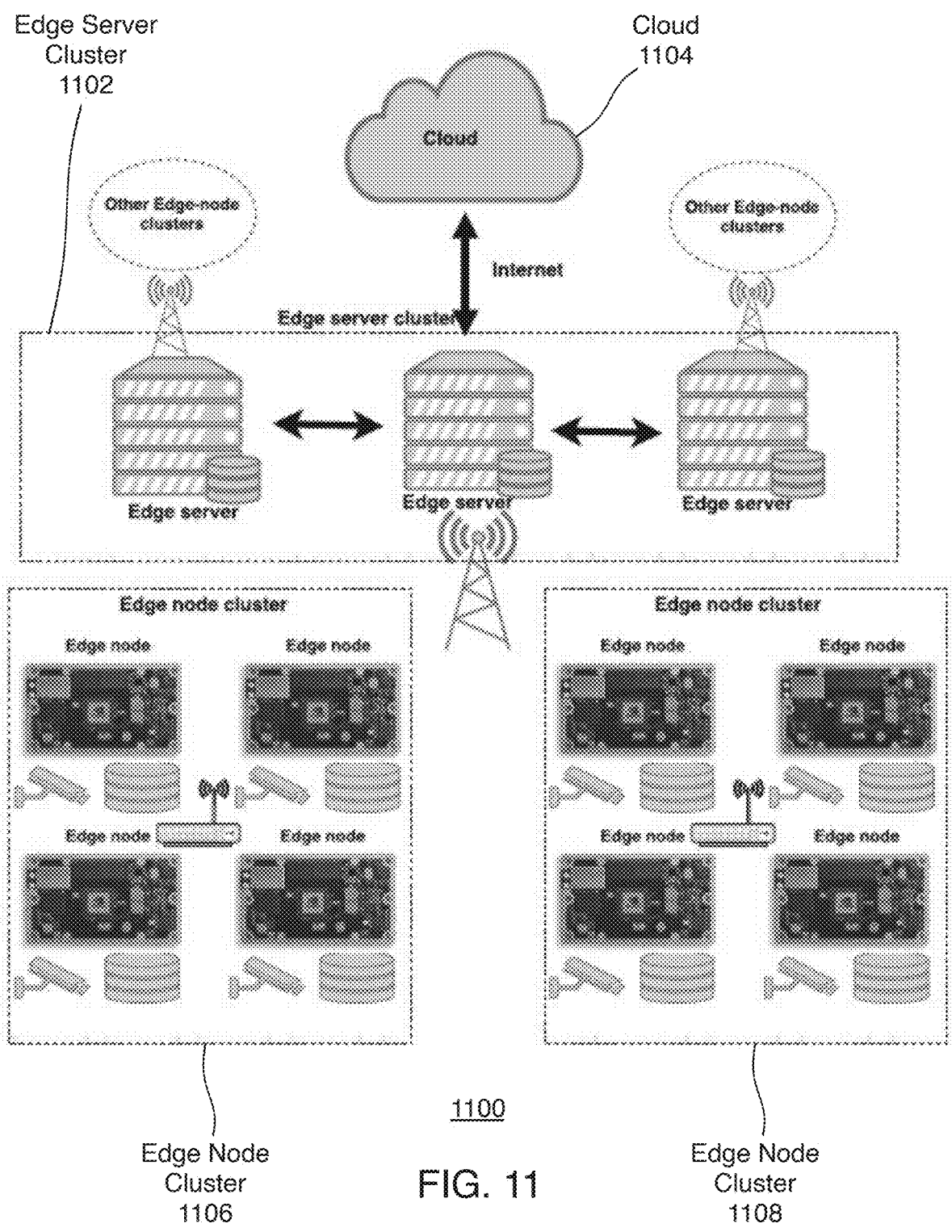
FIG. 11 is a block diagram of an example environment including an edge server cluster and multiple edge node clusters for detecting anomalies in multiple target environments.

FIG. 11 is a block diagram of an example environment 1100 including an edge server cluster and multiple edge node clusters for detecting anomalies in multiple target environments. The environment 1100 is an example of vision edge infrastructure architecture, including video analytics architecture. Shown is an edge server cluster 1102, a cloud 1104, and edge node clusters 1106 and 1108.

In various embodiments, a number of cameras equipped with computing nodes (edge nodes) monitor a target environment or geographic area of interest (e.g., a traffic light intersection, etc.). The edge nodes are equipped with custom vision processing hardware engines based on deep learning that identify image feature vectors and key frames of interest in video footage (e.g., streaming video, etc.). The edge nodes filter the data stream, thereby reducing the data size and velocity. Multiple edge nodes are served by a relatively powerful edge server cluster that processes these features vectors and key frames obtained from multiple edge nodes using distributed deep learning to identify the activity of interest. The edge nodes are connected to a cloud service (e.g., a CloudLab National Science Foundation (NSF) cloud, etc.). In various embodiments, environment 1100 may include four major components to enable distributed real-time edge video analytics at the edge: analysis and tracking algorithm, vision processing hardware, system software, and security.

The follow description involves distributed deep learning inspired scene analysis and tracking. From an algorithm perspective, the system leverages a deep learning paradigm for object detection, classification, and tracking. Deep learning provides near human or human-like accuracy in visual cognitive inference. Convolutional neural networks (CNNs) are an efficient class of algorithms for accurate object detection and classifications by extracting deep features of the image data. One example is Yolo object detection system, developed at the University of Washington. While CNN is a fairly rich topic, leveraging deep learning paradigm for visual tracking particularly in the context of distributed multi-cameras is at early stages. Embodiments may involve developing novel recurrent neural networks (RNNs) on top of CNN to create full end-to-end object detection, classification, and tracking at the edge. In this regard, the AI system leverages the recent advances in long short-term memory networks (LSTMs) to capture complex time sequences for tracking and behavioral analysis of pedestrian/vehicles.

Figure 12:
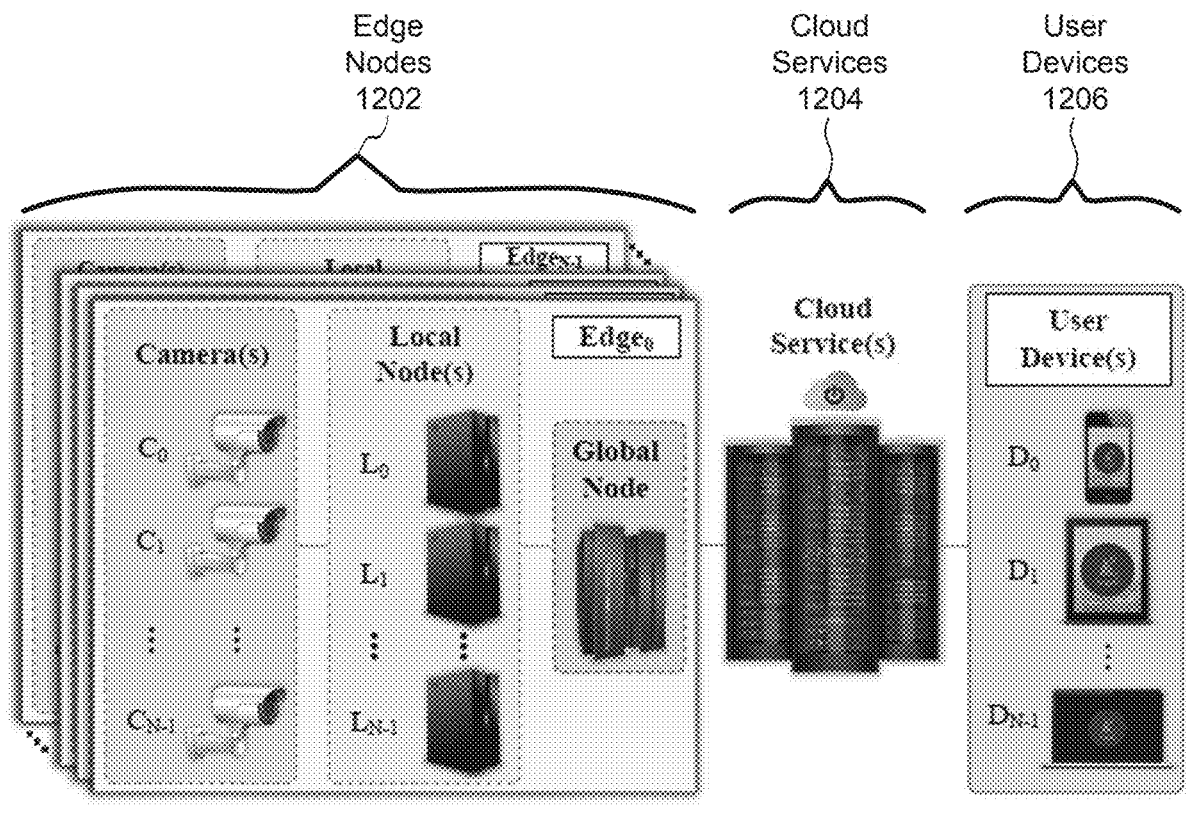
FIG. 12 is a block diagram of an example environment, including edge nodes, cloud services, and user devices for providing scalable intelligent video surveillance for the artificial intelligence of things.

FIG. 12 is a block diagram of an example environment 1200, including edge nodes 1202, cloud services 1204, and user devices 1206 for providing scalable intelligent video surveillance for the AIoT. As shown in FIG. 12, and indicated herein, embodiments may exist within three logical and physical segments: the edge, the cloud, and user devices. The edge uses a plethora of advanced artificial intelligence algorithms processing data received from cameras to facilitate intelligent security. Using a single workstation to perform edge processing, the AI system can monitor up to 4 cameras in real-time at 30 FPS, or up to 8 cameras at 15 FPS, in scenarios with both medium and heavy crowd density. The AI system performs high-level cognitive tasks (e.g., action recognition, anomaly detection) with ~1% deviation in accuracy from current state-of-the-art (SotA).

The AI system is designed from the ground up to respect the privacy of the people and communities being surveilled. The AI system does not store any personally identifiable information in any databases and does not make use of invasive AI techniques such as facial recognition or gait detection. The AI system strictly provides pose and locational information for high-level tasks (e.g., action recognition, anomaly detection), as opposed to identity information, which is common. The AI system analyzes what a person is doing, not who they are. This allows The AI system to act as a buffer to help remove biases based on race, ethnicity, gender, age, and socio-economic factors, which can lead to a reduction in the unnecessary conflict between authorities and marginalized communities that has become increasingly problematic. After data is processed on edge and sent to the cloud for communication and service management with user devices. A mobile app allows user devices to receive data from the cloud, including alerts when potential security concerns arise.

Embodiments provide the first end-to-end scalable real-world intelligent video surveillance system capable of performing high-level cognitive tasks in real-time while achieving SotA accuracy. Embodiments also address the ethical concerns of intelligent video surveillance, both from a privacy and fairness perspective, and illustrate how the AI system's design is purpose-built to address them. Embodiments also perform an end-to-end empirical evaluation of the AI system using high-level cognitive tasks directly related to intelligent surveillance, action recognition, and anomaly detection, investigating the trade-off in accuracy required to achieve real-time performance. Embodiments also perform an exhaustive system-level evaluation of the AI system's real-time performance and scalability across different classes of hardware and increasing scenario intensities, displaying how The AI system is able to meet real-time intelligent security needs in different contexts.

To address the latency concerns of real-time video surveillance, a shift towards edge computing is needed. Nikouei et al. explore the feasibility of using low-power edge devices to perform object detection and tracking in surveillance scenarios. They argue that in worst case 5 FPS is high enough throughput for tracking humans in surveillance applications, and as such computation can be pushed to the edge. However, their results show that even light weight convolutional neural networks can prove problematic for low-power devices, often reducing throughput below the 5 FPS threshold. Embodiments described herein use low power embedded GPUs to perform detection, tracking, path prediction, pose estimation, and multi-camera re-identification in a surveillance environment, while placing a focus on real-time execution and the privacy of tracked pedestrians. Embodiments focus solely on object detection, tracking, and multi-camera re-identification to increase throughput. Embodiments use a combination of lightweight object detection models on the edge and more computationally expensive models in the cloud, splitting computation between the two to provide real-time video surveillance in a construction site environment. Embodiments may use background detection, vehicle detection, and a Kalman filter based tracking for parking lot surveillance and determining lot occupancy. Embodiments may also use object detection, person tracking, scene segmentation, and joint trajectory and activity prediction for pedestrians in a surveillance setting.

The future of intelligent surveillance is heading towards systems able to perform high-level cognitive tasks. A recent survey focusing on real-world video surveillance asserts that while the domain of video surveillance is comprised of understanding stationary object, vehicles, individuals, and crowds, the ability to determine when anomalous events occur is paramount for intelligent surveillance systems. Other research has supported this assertion. Some systems utilize the Infinite Hidden Markov Model and Bayesian Nonparametric Factor Analysis to find patterns in video streams and detect abnormal events. Embodiments describe herein employ active learning and fuzzy aggregation to learn what constitutes an anomaly continually over time, adapting the scenarios not seen in standard datasets. Embodiments also detect suspicious behaviors in a mall surveillance setting, using lightweight algorithms such as segmentation, blob fusion, and Kalman filter based tracking. AnomalyNet is a recently proposed recurrent neutral network with adaptive iterative hard-thresholding and long short-term memory that works directly off pixel information to eliminate background noise, capture motion, and learn sparse representation and dictionary to perform anomaly detection in video surveillance.

As described herein, embodiments address ethical concerns. Video surveillance has always been associated with social and ethical concerns, whether in traditional form or more recent intelligent formats. Respecting citizens' privacy and autonomy while improving public safety and security are the most well-known and enduring ethical issues in this context. Developing a successful smart video surveillance solution that addresses the public safety problem and engages the community up to a certain level is possible by considering these concerns.

There is rising attention among scholars to the issue of incorporating privacy concerns at the design level, referred to as "privacy by design." The source of discrimination and privacy violation in many data-driven and AI-based systems, such as Smart video surveillance technology, is using personal identifiable information (PII). Using PII, such as actual footage of people's daily activities at any stage of the technology, can increase the risk of privacy violation. There is a long-lasting debate on the ethical challenges of using facial recognition technologies in different sectors and how using this technology can result in privacy violation.

The approaches used to perform high-level cognitive tasks in intelligent video surveillance, such as action recognition and anomaly detection, may be grouped into two distinct categories based on the data used. The first category directly utilizes pixel data. A common example is facial recognition, where algorithms look at images of people's faces to identify them. These algorithms can perform well with sufficient historical data, but are often seen as intrusive and increase the risk of identifying personal demographic information. The second category only leverages processed information, such as pose data in the case of embodiments described herein, which tend to deidentify personal demographic information. This is not a complete removal of PII, as some works have been able to identify individuals purely by gait or silhouette, but it significantly reduces the risk to privacy compared to pixel-based approaches.

Similarly, avoiding facial recognition technologies does not guarantee the system is entirely privacy persevering. Storing images of pedestrians is another source of ethical violation. From the discrimination perspective, using any form of PII can contribute to the issue of marginalization in policing systems. Therefore, an essential step in designing a nondiscriminatory system is to ensure the system is not dependent on PII. This requires a specific approach toward the design of such technology in the choice of algorithm, the type of data used, and the storing of such data.

Embodiments described herein address this by not storing any PII or sending any PII across the network. Such data is destroyed after it is used. The AI system utilizes pose-based methods for all high-level cognitive tasks, severely limiting the amount and quality of PII used by such algorithms. This allows such processing without any potential for gender, ethnicity, or class-based discrimination. As such, embodiments described herein are able to address many of the privacy concerns regarding intelligent video surveillance while also addressing the ethical issue of discrimination.

The following describes various experimental results. In various embodiments, the algorithmic core of the AI system consists of multiple algorithms, each of which works off of data generated by the previous algorithms. As these algorithms leverage imperfect neural networks, they generate noise that accumulates through the system. To understand the source of this noise, embodiments may first factor in the accuracy of each of these core algorithms in isolation. Table I shows the accuracies of the algorithmic core's four main tasks: object detection, pedestrian tracking, human pose estimation, and person re-identification. The table also shows the accuracies of the top SotA models in each task. These SotA methods are not suitable for intelligent surveillance applications, as their excessive computation and vast parameters make real-time execution impossible, but the comparison allows us to see the maximum potential allowable by current research and the accuracy loss incurred to keep the AI system performing in real-time.

TABLE 1

ACCURACY OF ANCILIA'S ALGORITHMIC CORE NETWORKS
IN ISOLATION. SOTA ALGORITHMS REPRESENT THE
HIGHEST PERFORMANCE CURRENTLY ACHIEVABLE WHEN
COMPUTATION AND LATENCY ARE NOT A CONCERN.

| Task | Method | Performance | Dataset |
|---|---|---|---|
| | Ancilia's Algorithmic Core | | |
| Object Detection | YOLOv5 [41] | 49.0 (mAP) | COCO [59] |
| Tracking | ByteTrack [45] | 77.8 (MOTA) | MOT20 [60] |
| Pose Estimation | HRNet [46] | 75.1 (AP) | COCO [59] |
| Person ReID | OSNet [49] | 88.6 (Top-1) | DukeMTMC [61] |
| | State-of-the-Art Algorithms | | |
| Object Detection | Internimage [62] | 65.0 (mAP) | COCO [59] |
| Tracking | SOTMOT [63] | 77.9 (MOTA) | MOT20 [60] |
| Pose Estimation | ViTPose [64] | 81.1 (AP) | COCO [59] |
| Person ReID | Centeroids-ReID [65] | 95.6 (Top-1) | DukeMTMC [61]l |

Object detection sees the biggest hit to accuracy, with a 16% drop from SotA. This is intuitive, as YOLOv5 is not only the largest model in the algorithmic core, but also the only one that operates on the raw camera stream. While larger models are available and would be able to produce higher accuracy, even a slight increase in model size or computation would result in a noticeable decrease in throughput. Human pose estimation sees a decrease in accuracy for a similar reason, though much smaller in scale at only 6%. While HRNet is not run on the raw camera stream, it is run individually for each person detected by the object detector. As such, maintaining a small model size is preferable. Person re-identification sees a slightly larger drop in accuracy than human pose estimation at 7%. While this is partly due to using a lightweight model, OSNet, the SotA model for person reID is also lightweight. However, the SotA uses a centroid based retrieval method not suitable for pen-set reID, of which most surveillance scenarios are. Pedestrian tracking sees almost no drop in accuracy, approximately 0.1%. This stems from the comparative ease of tracking pedestrians in a single camera, where a simple, lightweight algorithm like Byte Track see almost no performance difference from the top-of-the-line SotA approaches.

With regard to high-level tasks, to better understand how the noise generated by the algorithmic core effects overall performance, and thus how well the AI system performs in the realm of real-world intelligent surveillance, the performance of two high-level cognitive surveillance tasks may be considered when running on the AI system. For the AI system to be a benefit to intelligent surveillance tasks, embodiments ensure that excess false alarms or missed positive events do not occur. To assess this, action recognition and anomaly detection may be utilized, as these tasks can utilize the human pose information generated by the algorithmic core, resulting in faster and less biased inference. Since both these methods utilize temporal batches of human poses for each individual, these experiments will directly reflect the quality of the object detection, tracking, re-identification, and pose estimation data generated by the AI system.

With regard to high-level tasks and action recognition, embodiments described herein may use state-of-the-art action recognition models, such as PoseConv3d, CTR-GCN, or the like, and train them using data generated with embodiments described herein. For each model, Embodiments described herein may be trained and tested with full (30 FPS) and half (15 FPS) throughput on NTU60-XSub, or the like. Both models use a window size of 30 and are trained for 24 epochs using stochastic gradient descent (SGD) with a momentum of 0.9 and Cosine Annealing scheduling. PoseConv3d and CTRGCN have weight decay of $3e^{-4}$ and $5e^{-4}$ and an initial learning rate of 0.4 and 0.2, respectively.

TABLE II

TOP-1 AND TOP-5 ACCURACIES ON NTU60-XSUB [66] IN
FULL AND HALF THROUGHPUT MODES FOR POSECONV3D [50]
AND CTR-GCN [51].

| Model | Data | FPS | Top-1 (%) | Top-5 (%) |
|---|---|---|---|---|
| PoseConv3D [50] | [67] | 15 | 91.96 | 99.47 |
| | | 30 | 92.76 | 99.57 |
| | Ours | 15 | 88.79 | 98.82 |
| | | 30 | 91.99 | 99.28 |
| CTR-GCN [51] | [67] | 15 | 86.36 | 98.46 |
| | | 30 | 83.07 | 98.26 |
| | Ours | 15 | 81.58 | 97.52 |
| | | 30 | 80.44 | 97.2 |

The results of these experiments can be seen in Table. II. Embodiments described herein result in Top-1 and Top-5 accuracy and compare the results using data generated by the AI system to the original data available through the PYSKL toolbox. The AI system provides data of comparable quality to the original; action recognition as a high-level task in the AI system sees around 1% drop in accuracy compared to the original data using PoseConv3D at full throughput, and around 3% at half throughput. Using CTR-GCN, the AI system sees a 2.5% drop at full throughput and a 4.8% drop at half throughput, compared to the original data. From this, it can be inferred that PoseConv3D is more robust to noise than CTR-GCN, however both performed reasonably well with data generated by the AI system, demonstrating its efficacy for intelligent surveillance applications.

Another interesting observation is that CTR-GCN actually performed noticeably better at half throughput than at full throughput. This means that CTR-GCN is more suited to taking advantage of the higher temporal window allowed when using half throughput. This is something to consider when choosing an action recognition model when a real-time throughput of 30 FPS cannot be guaranteed.

With regard to high-level task and anomaly detection, using the ShanghaiTech dataset, the AI system may be trained with state-of-the-art anomaly detection models, such as GEPC, MPED-RNN, or the like, using both data generated by the AI system and the data provided by the original authors. The same training strategy from Sec. VI-B1 is used, with both models trained in full (20 FPS) and half (10 FPS) modes. GEPC is trained for 25 epochs with a window size of 30 and stride of 20 using Adam optimizer with a learning rate of $1e^{-4}$, weight decay of $1e^{-5}$, and batch size of 512. MPED-RNN is trained with an input window size of 30, a reconstruction window of 12, and a prediction window of 6. The model is trained for 5 epochs using the Adam optimizer with a learning rate of $1e^{-3}$ and a batch size of 265.

TABLE III

AUC ROC, AUC PR, AND EER ON SHANGHAITECH
DATASET [68] IN FULL AND HALF
THROUGHPUT MODES FOR GEPC [52]
AND MPED-RNN [53].

| Model | Data | FPS | AUC ROC | AUC PR | EER |
|---|---|---|---|---|---|
| GEPC [52] | [52] | 10 | 0.6906 | 0.5951 | 0.35 |
| | | 20 | 0.7372 | 0.6427 | 0.31 |
| | Ours | 10 | 0.6888 | 0.5905 | 0.35 |
| | | 20 | 0.7223 | 0.6023 | 0.32 |
| MPED-RNN [53] | [53] | 10 | 0.6645 | 0.5733 | 0.37 |
| | | 20 | 0.7023 | 0.5869 | 0.36 |
| | Ours | 10 | 0.6685 | 0.5661 | 0.37 |
| | | 20 | 0.6679 | 0.5487 | 0.37 |

The results of this experiment are shown in Table. III. In line with current practices, area under the receiver operating characteristic cure (AUC ROC) may be reported, area under the precision-recall curve (AUC PR), and the equal error rate (EER). With GEPC, the AI system more than measures up to the task, with only a 1.5% drop in AUC ROC at full throughput and less than a 0.2% drop in AUC ROC at half throughput. AUC PR shows a more substantial drop of 4% at full throughput, but goes down to less than 0.5% at half throughput. Equal Error Rates are almost identical, seeing almost no change (less than 0.01) when using the AI system.

MPEDRNN, which displayed lower overall accuracy in all regards to begin with, sees a more significant drop in AUC ROC at full throughput, losing 3.5%. However, at half throughput the AUC ROC actually increases when using the AI system, though only by 0.5%. The AUC PR results mirror that of GEPC, dropping 3.8% at full throughput and 0.7% at half throughput. The Equal Error Rates are once again nearly identical. Being able to perform a high-level task such as anomaly detection while maintaining accuracies so close to current SotA in research, demonstrates the AI system's ability to produce quality data, suitable for intelligent surveillance applications.

Figure 13:
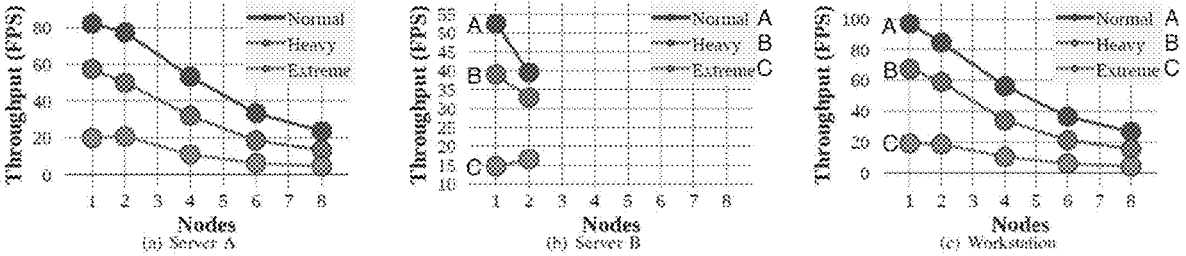
FIG. 13 is a graph showing throughput of the AI system with respect to number of nodes across different crowd densities.

FIG. 13 is a graph showing throughput of the AI system with respect to number of nodes across different crowd densities. Some hardware details are shown in Table. IV below. The follow describes real-time system performance of the AI system. Algorithmic accuracy is vital for ensuring the information provided by high-level cognitive tasks is beneficial for surveillance applications. However, the ability of the AI system to perform in real-time is equally important. A series of experiments may be conducted, evaluating the runtime performance of the AI system on different hardware, with different scenario intensities, and for increasing number of local nodes per hardware device. Embodiments focus on the performance of the local node, as the global node is completely decoupled from the algorithmic pipeline and has no noticeable effect on throughput or latency.

TABLE IV

SYSTEM CONFIGURATIONS. STATS ARE PER CPU/GPU OF THE LISTED TYPE.

| Name | Processor | | | | GPU | | |
|---|---|---|---|---|---|---|---|
| | Model | Cores | Clock Speed | Model | | CUDA Cores | VRAM |
| Server A | 2× EPYC 7513 | 32 | 2.6 GHz | 4× V100 | | 5120 | 32 GB |
| Server B | 2× Xeon ES-2640 v4 | 10 | 2.4 GHz | 2× Titan V | | 5120 | 12 GB |
| Workstation | Threadripper Pro 3975WX | 32 | 3.50 GHz | 3× A6000 | | 10752 | 48 GB |

TABLE V

AVERAGE THROUGHPUT AND LATENCY. DATA COLLECTED USING
THE WORKSTATION WITH VARYING LOCAL NODE COUNTS.

| Crowd Density | Nodes | Server A | | Server B | | Workstation | |
|---|---|---|---|---|---|---|---|
| | | FPS | Latency (s) | FPS | Latency (s) | FPS | Latency (s) |
| Normal | 1 | 82.31 | 1.17 | 52.45 | 1.52 | 96.88 | 0.87 |
| (70 detections | 2 | 77.59 | 1.15 | 39.50 | 2.05 | 84.57 | 1.00 |
| per second) | 4 | 53.40 | 1.60 | — | — | 56.27 | 1.58 |
| | 6 | 33.43 | 1.99 | — | — | 36.40 | 2.27 |
| | 8 | 23.64 | 2.05 | — | — | 26.60 | 2.84 |
| Heavy | 1 | 57.47 | 1.80 | 38.97 | 2.62 | 67.25 | 1.53 |
| (216 detections | 2 | 50.05 | 2.07 | 32.85 | 3.16 | 58.95 | 1.77 |
| per second) | 4 | 32.09 | 3.45 | — | — | 33.99 | 3.98 |
| | 6 | 18.51 | 4.17 | — | — | 21.08 | 6.89 |
| | 8 | 13.35 | 5.87 | — | — | 15.48 | 9.54 |
| Extreme | 1 | 19.84 | 5.29 | 14.67 | 7.37 | 19.00 | 5.73 |
| (744 detections | 2 | 20.76 | 5.09 | 16.56 | 6.54 | 18.45 | 5.81 |
| per second) | 4 | 10.95 | 11.64 | — | — | 10.29 | 12.49 |
| | 6 | 6.25 | 20.70 | — | — | 5.93 | 21.87 |
| | 8 | 4.53 | 28.48 | — | — | 4.18 | 31.19 |

In some embodiments, three different hardware configurations may be selected for these experiments: a high-end server, a lower-end server, and a high-end workstation, as seen in Table. IV. For various scenarios, embodiments described herein may use the DukeMTMC-video dataset, or the like, and select three scenes with different crowd densities: normal density, heavy density, and extreme density.

Figure 14:
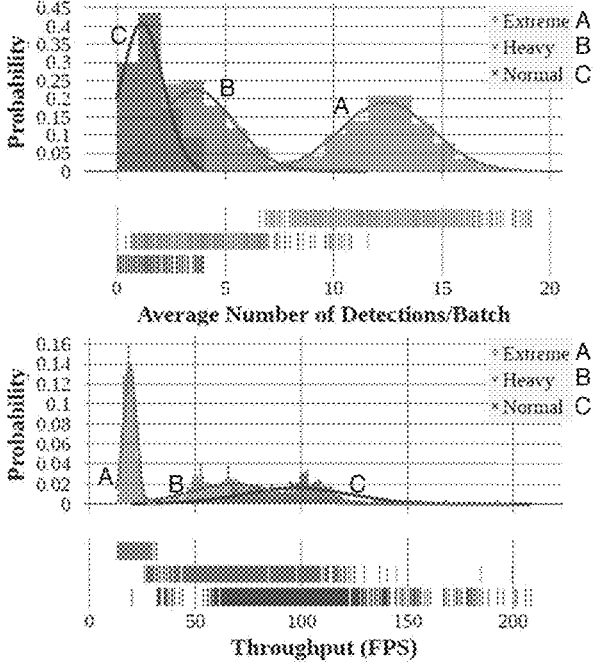
FIG. 14 shows the distribution of detections for different crowd densities and its effect on throughput.

FIG. 14 shows the distribution of detections for different crowd densities and its effect on throughput. Data collected using the Workstation with a single local node. The distribution of detection density in each scenario, as well as their effect on throughput, is shown in FIG. 14. Note that what is considered "normal density" may change based on application environment, which is why such a wide range is reported. Each video lasts for 32k frames, with 7k frames warm-up and cool-down. Embodiments may test using 1, 2, 4, 6, and 8 local nodes on a single system, showing how throughput and latency scale in such cases. Each experiment is conducted three times, the throughput and latency averaged across runs. The results of these experiments are shown in Table. V and FIG. 13.

Under normal crowd density, Server A and Workstation are both able to achieve over 50 FPS with up to four local nodes, with an end-to-end latency of 1.60 and 1.58 seconds respectively. This is well above FPS required by action recognition and anomaly detection algorithms at full throughput, and the latency is low enough to be suitable for most surveillance applications where the main concern is to notify authorities in time for appropriate response. Both Server A and Workstation are able to handle 6 local nodes in the normal scenario while maintaining above 30 FPS. Workstation is able to maintain above 26 FPS while running all 8 local nodes, while Server A drops to just below 24 FPS at 8 local nodes. Server B is able to achieve over 50 FPS with a single node but falls just short of 40 FPS while handling two nodes simultaneously. Due to having only two GPUs with limited VRAM, Server B was unable to run 4 or more nodes concurrently.

Heavy crowd density proves more challenging, with both Server A and Workstation only able to achieve above 30 FPS with up to 4 nodes. The end-to-end latency is also longer than it was under normal crowd density, with all systems seeing between a 50% to 100% increase in most cases, and up to a 230% increase at the mose extreme. Server A and Workstation are able to maintain above 15 FPS at 6 and 8 nodes respectively, while Server A drops to just above 13 FPS at 8 nodes. Server B behaves similarly to how it did with normal crowd density, still able to maintain above 30 FPS for up to 2 nodes, though with slightly low throughput. Assuming only half throughput was needed for high-level tasks, Server B would still be suitable for running up to two nodes.

With the extreme crowd density scenario, the AI system may begin to struggle. None of the systems are able to achieve above 30 FPS even with a single camera, putting full throughput action recognition out of reach. Server A is able to achieve above 20 FPS with 2 nodes (but notably not with 1) and Workstation fall short even with 1 node. Both Server A and Workstation can maintain above 10 FPS at 4 nodes, but both drop to around 6 and 4 FPS at 6 and 8 nodes, respectively. It has been argued that 5 FPS is suitable for tacking pedestrians, and while that is true, high-level tasks that rely on detailed human motion, such as action recognition and anomaly detection, often struggle for accuracy when running below 10 FPS. Another issue is with the increased latency. Running 6+nodes, Server A and Workstation have latencies over 20 seconds, which is suitable for many surveillance applications, but might be too much for those that require sharper response times. Combined with the low throughput, it becomes difficult to recommend running more than 4 nodes on a single system with the AI system when operating under extreme crowd density, expect for applications where low throughput and high latency are not as much of a concern. Server B is unable to achieve 30 FPS, but does stay around 15 FPS for both 1 and 2 nodes, making it suitable for half throughput in action recognition and anomaly detection.

Interestingly, with extreme crowd density unusual behavior may be seen with both servers having worse performance with a single node than they do with 2 nodes. This is likely caused by the abundance of CPU resources available to them with their dual CPU configuration and a single node being unable to fully utilize them. As such, the behavior of both servers in the extreme crowd density scenario does not start to match the expected behavior and mimic the other systems until multiple nodes are being run simultaneously. This behavior is not too concerning, considering it does not make sense to purchase such a high-end server class machine for only running a single local node, when a more latency focused workstation would be both cheaper and more effective.

TABLE VI

EFFECT OF DIFFERENT BATCH SIZES
ON THROUGHPUT AND LATENCY.

| Crowd Density | Batch Size | FPS | Latency (s) |
|---|---|---|---|
| Normal | 1 | 40.58 | 0.27 |
| | 10 | 91.66 | 0.58 |
| | 15 | 96.88 | 0.87 |
| | 20 | 96.69 | 1.11 |
| | 30 | 100.46 | 1.58 |
| Heavy | 1 | 21.13 | 0.42 |
| | 10 | 66.35 | 1.14 |
| | 15 | 67.25 | 1.58 |
| | 20 | 67.73 | 2.03 |
| | 30 | 69.62 | 3.02 |
| Extreme | 1 | 9.34 | 1.04 |
| | 10 | 18.92 | 3.89 |
| | 15 | 19.00 | 5.73 |
| | 20 | 19.28 | 7.48 |
| | 30 | 19.52 | 11.00 |

Overall, the AI system meets the needs of high-level cognitive tasks while still achieving performance suitable for real-time intelligent surveillance applications. Exact performance is dependent on both the hardware used and the intensity of the scene, but these results show that even for the most extreme of scenarios, the AI system may be used to provide intelligent assistance to surveillance applications.

Figure 15:
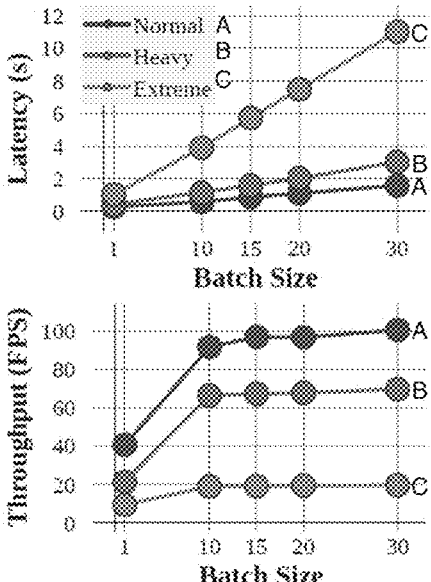
FIG. 15 shows throughput and latency trends with respect to batch size across different crowd densities. The data was collected using Workstation with a single local node.

FIG. 15 shows throughput and latency trends with respect to batch size across different crowd densities. The data was collected using Workstation with a single local node. With regard to the effect of batch size on real-time performance, to understand the effect of batch size on end-to-end latency and throughput, embodiments may be tested using a single node on a workstation but varying the batch size. The results of this are shown in FIG. 15. As expected, both latency and throughput increase with batch size across all densities. The jump in throughput from a batch size of 1 to a batch size of 10 is the most dramatic, with diminishing returns using larger batch sizes, while increases in latency tend to be more proportional. However, due to the high-level tasks needing 30 frames, the end-to-end latency is not directly representative of the latency of performing high level tasks.

Overall, a balance needs to be struck between throughput, end-to-end latency, and batch size. Too high of an end-to-end latency will affect the speed at which detected objects of interest raise alarms, while a lower throughput can affect high level task accuracy, as seen in Sec. VI-B. Likewise, having too small of a batch size means more batches need to be processed before high-level tasks can operate. A batch size of 15 strikes this balance well, with less than a second of end-to-end latency of 0.87 seconds and a throughput of 96.88 FPS in normal density, and only needing to process two batches for high level tasks. This proves similar for heavy and extreme crowd densities as well, though the throughput is higher and latency is lower, as expected.

As shown in the results herein, embodiments provide an end-to-end scalable intelligent video surveillance system for the AIoT. Through empirical evaluation, embodiments have demonstrated their ability to bring state-of-the-art AI to real-world surveillance applications. Embodiments performs high-level cognitive tasks (e.g., action recognition and anomaly detection) in real-time, all while respecting ethical and privacy concerns common to surveillance applications.

Figure 16:
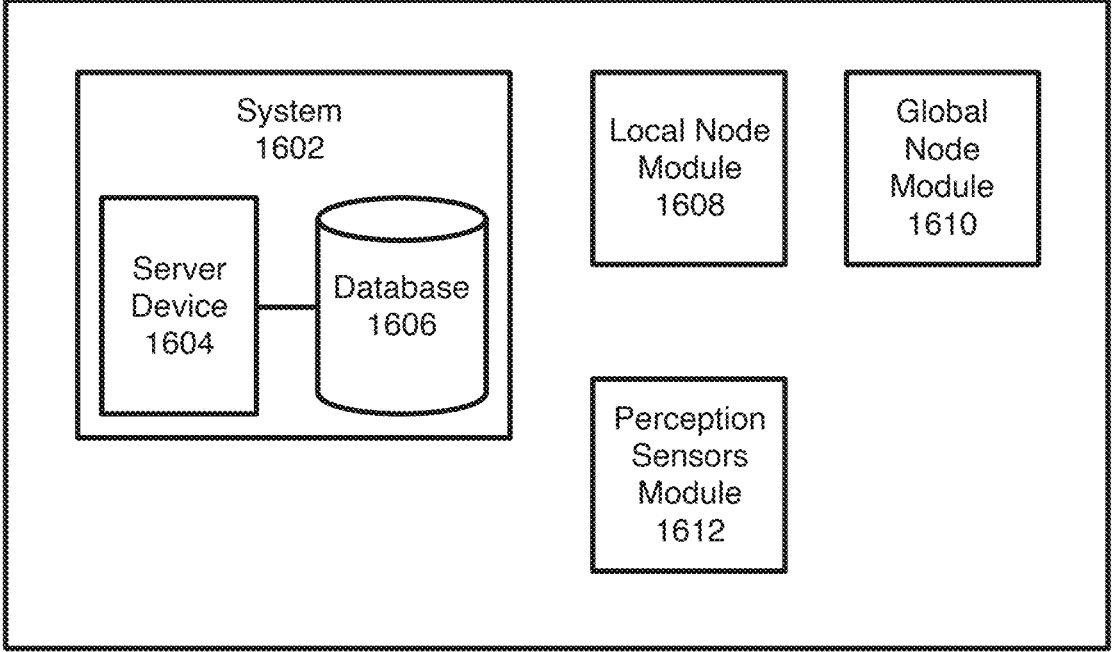
FIG. 16 is a block diagram of an example high-level architecture for detecting anomalies in a target environment.

FIG. 16 is a block diagram of an example high-level architecture 1600 for detecting anomalies in a target environment. Shown is a system 1602, which may be used to implement the AI system 202 of FIG. 2. In various embodiments, the system 1602 may be an AI software product that resides in an edge node, such as the edge node 204 of FIG. 2. The system 1602 includes a server device 1604 and a database 1606. The database 1606 may be used to implement the local database 218 of FIG. 2 or other databases described herein. Also shown is a local node module 1608 and a global node module 1610, which may be used to implement the local node module and global node module described above in connection with the description of FIG. 2, for example.

Also shown is a perception sensors module 1612. In various embodiments, the local node module 1608, the global node module 1610, and the perception sensors module 1612 may be implemented using a combination of hardware and software. In various embodiments, the software may include and execute any suitable AI model, including any AI, machine learning, and computer vision techniques to track target objects in a target environment, as well as to predict any impending high-risk and/or high danger events in a target environment. The system 1602 may utilize the AI model to perform various warning or alert actions described herein.

The system 1602 communicates data signals and control signals with the local node module 1608, the global node module 1608, and the perception sensors module 1612 via the server device 1604. The database 1606 may be used to store various types of data and information such as video footage, metadata associated with a given target environment, metadata associated with target objects, metadata associated with perception sensors, as well as local and global AI training information, for example.

The system 1602 enables the local node module 1608 to receive, at an edge node, video footage of a given target environment from one or more perception sensors. As indicated herein, the local module 1608 may include an AI pipeline that is configured to process the video footage received from the one or more perception sensors. Also, as indicated herein, the system 1602 and its associated edge node is local to the target environment and the one or more perception sensors in the target environment. The system 1602 enables the global node module 1610 to process the video footage received from the AI pipeline and configured to send processed anomaly information to a cloud server. The processed anomaly information may include warning or alerts as well as any relevant details associated with a high-risk or dangerous scenario at the target environment. The system 1602 enables the perception sensors module 1612 to control and communicate data to and from the perception sensors in the target environment to detect and track target objects. As indicated herein, the system 1602 observes one or more target objects in the video footage of the target environment in real time, and detects at the edge node one or more anomalies in the target environment based on the observing of the one or more target objects in real time, where the one or more anomalies are specific to the target environment.

The following are addition embodiments. In some embodiments, the AI system provides a computer network for determining and predicting behaviors and movement patterns of a subject including human subjects. In various embodiments, the AI system provides a computer implemented system for determining a pose of a subject, the system including a backbone network, a high-resolution network, and a heatmap prediction network. In various embodiments, the AI system provides a heuristic-based compound scaling method for bottom-up pose estimation using a scaling coefficient to jointly scale the backbone network, the high-resolution network, and the heatmap prediction network. In various embodiments, the AI system provides backbone network that is scaled below a baseline and the overall network is scaled down to maintain accuracy while creating lightweight and flexible networks.

Recent advances in information processing and communication technologies have opened the path toward smart and connected communities where sustainable social, economic, and environmental well-being is enhanced. Information science and engineering, in principle, revolutionizes community environments by offering real-time sensing, intelligent processing, and extensive communication, fully integrated into community environments. However, to effectively apply technology to community problems, domain experts, community partners (including community residents), and computer scientists and engineers need to work closely together.

In some embodiments, the system creates a self-aware network that enables tracing potentially hazardous spatial trajectories and criminal activities in community environments. In pedestrian safety, the proposed research enables real-time threat detection and prediction of safety events in community environments. In smart policing, the aim is to reduce officer and police department bias to minimize the tension and achieve much higher coverage in community environments, filtering out unnecessary calls while maintaining the privacy of community individuals. Few examples are: a child playing on the sidewalk suddenly darting onto the street, a distracted pedestrian venturing onto a crossing in front of oncoming traffic, a male pedestrian taking chances through traffic stream with inadequate gaps, pedestrians at a high crash location not looking left and right before making the decision to cross, and, movement patterns of individuals indicating criminal intent such as attempting to unlock multiple parked cars.

In this regard, a context-aware sensing system which primarily relies on the real-time video analytics next to the video cameras (edge video analytics) is provided. Embodiments leverage the recent advances in edge computing, computer vision, and deep learning, and extend them, to enable real-time pedestrian/vehicle detection and tracking as well as top-level behavioral analysis completely integrated to the community environment, without the need to store and save the actual video data and transfer them to the cloud. One aim is to push video analytics toward disaggregation, as such to be integrated to the fabric of the community. To this end, embodiments provide processing platforms for custom on-the-fly execution of deep learning algorithms (real-time edge video analytics engine). At the same time, the technology offers the capability of selective recording and storing the video data if a potential threat (e.g., crash, or criminal activities) is detected.

In various embodiments, a holistic vertical solution embracing technical challenges at multiple abstraction levels, starting from real-time processing near the cameras up to cooperative processing over the entire edge network is provided.

In various embodiments, the AI system may utilize a process framework that involves object (pedestrian/vehicles) detection and classification parts are based on existing CNN framework (e.g., Yolo). It creates a scalable LSTM based framework for tracking and time sequence analysis. The LSTM (tracking part) relies on the feature vector as the output of CNN (4096 KB in the Yolo example) and objects coordinates (X, Y, length, height) per each image. The number of hidden layers per each layer is equal to feature vectors generated by CNN. Embodiments chain multiple LSTM layers as such they can they track the object trajectory over streaming feature vectors in a pipeline fashion. Compared to the recently published approach which stacks the LSTM layers for capturing the time sequence over concurrent frames, embodiments are tailored for edge devices and the streaming nature of edge processing with the assumption that multiple images of the video are not available at the same time. The proposed process leads to significant memory saving and reduction in memory access requests, thereby significantly enhancing performance.

With regard the multiple cameras, a significant challenge is distributed tracking across multiple cameras with different perspectives. This often demands fine-tuned calibration with respect to angles, and position of individual cameras. In this work, embodiments provide full deep learning based multi-camera object detection and tracking.

In various embodiments, the AI system may utilize algorithm framework involving individual cameras will run CNN (for detection), and LSTM (for tracking), at the edge device. They also forward the feature vector per each frame (4 KB rather than 2 MB as an entire image) to the edge server. The edge server combines the features vector across multiple cameras, and construct an aggregate feature vector which captures features of the entire scene across multiple cameras. Then, it performs one more layer of CNN to extract correlation across feature vectors (across multiple cameras). The CNN layer at the edge essentially performs the task of camera calibration but using a deep learning approach. The difference angles and perspectives across multiple cameras will be considered as the scene feature; thus, learnable during the training phase. Embodiments also perform LSTM at the edge server to track the correlated features across multiple cameras.

For training such a distributed system that can correlate features across different angles (cameras), the AI system may use COIL-20 and COUL-100 datasets, or the like. Furthermore, embodiments may use neural turning machines, and differentiable neural computers for extracting complex behaviors at the edge server across multiple cameras.

With regard to real-time power-efficient processing at the edge, in various embodiments, the AI system may utilize domain-specific computation architecture, or AI inference processor. It enables real-time CNN and RNN processing over a pixel input stream close to the sensor (on-the-edge), with respect to algorithmic requirements. The proposed architecture provides server-class AI processing capabilities at the edge. It can become a key building block for building real-time video analytic systems at the edge.

Recently a number of new solutions to accelerate the deep learning convolution neural network (DCNN) layers have been proposed on GPU platforms. While GPUs are relatively successful for DCNN training, they are not able to offer the required performance and power efficiency (burning tens of Watt for real-time DCNN processing). With the trend toward customization, some approaches aim for dedicated custom hardware for DCNN processing targeting ASIC or FPGA implementations, or even crossbar analog circuit acceleration. However, the challenge is the lack of programmability to support various DCNN topological constructions.

In various embodiments, the AI system may achieve efficiency by specializing the compute platform and the internal communication toward the application domain. More general approaches, such as the Google TPU which rely on general matrix multiplication (GEMM) incur huge data redundancy and memory accesses while transforming the entire image into a large matrix and the performing matrix operations. In contrast, the key features of embodiments described herein work directly on streaming pixels without the need to store entire image or large batch sizes of video data. This is also very important from the privacy aspects of the computation. Additionally, it will also help to reduce unnecessary data movement throughout the memory hierarchy (keeping the data local in internal scratchpad memory buffer per block), as well as to provide a more deterministic execution behavior.

In various embodiments, the AI system may utilize an architecture of a deep learning inference processor. In various embodiments, the primary components may include: (1) 2D line buffers, (2) convolutional CGRAs, (3) pooling blocks (4) one fully connected (FC) block for final classification. Long short-term memory (LSTMs). As described in the algorithm part, LSTMs enable tracking the events over the time and can work on the output of CNN to track the identified objects over a sequence of frames. Internally, a LSTM consists of multiple "sigmoid" blocks, as an input gate layer, to decide which values to update, and one "tanh" block to normalize the values. Direct communication between the blocks, is realized through a streaming crossbar (e.g., AXI streaming fabric) with many ports (equivalent to the overall blocks). A dedicated control unit (CU) performs centralized scheduling and resource management. The CU governs allocation and configuration of physical blocks to construct a data path to realize the desired logical CNN topology. This enables the AI system to support a variety of CNN topologies including SqueezNet, AlexNet, GoogleNet, Yolo, and/or the like.

In various embodiments, the AI system may utilize vision edge operating system (VisEdgeSys). An extensible system software is crucial for managing the complexity, and providing a suitable abstraction for programming of video analytics applications at the edge. Additionally, the system software layer also facilitates monitoring, system administration, system upgrades, and security.

In various embodiments, the AI system may utilize software architecture, where a key goal is to be able to program at a scale across multiple heterogeneous computing and storage nodes, with short application development cycle. In developing VisEdgeSys, embodiments maximally leverage existing open-source system software, and best practices, while adapting these to the needs of edge video analytics. Rather than relying on relatively heavy weight virtual machines, embodiments use and expand the container paradigm to streamline the programming of the AI system. Containerization allows multiple virtual operating systems to run on a single host operating system, allowing customization of the environment to the application needs, while enabling the application container to run on any platform.

Unlike the monolithic applications of the past, modern cloud-native applications are composed as a set of distributed services (microservices), that explicitly communicate with each other either synchronously (e.g., HTTP) or asynchronously (for example, AMPQ), allowing for multiple services to be realized in different technologies in a scalable fashion. In the light of the wide success achieved in the cloud by the microservices architecture realized through containers, embodiments may use the same approach for VisEdgeSys. The lightweight nature of containers, helps them run on relatively resource poor platforms, such as the embedded boards at the edge nodes. However, a significant challenge is in adapting the container orchestration engines (COE) designed for the cloud to the edge computing paradigm. The microservice architecture maps well to containers, with each service being mapped to a single or a group of containers (pods). The containers are managed through a COE that maps the containers to physical nodes, schedules the containers, manages container execution, as well as networking of containers. Kubernetes, Mesos, and Docker Swarm are among the widely used COEs today.

In various embodiments, the AI system may utilize real-time container scheduling: embodiments enable real-time scheduling by incorporating the ability to gracefully preempt containers, and in low latency migration of containers from the edge server to the edge node (with respect to the availability of physical edge nodes). To this end, embodiments may employ open-source performance monitoring tools (e.g., Prometheus, cAdvisor, sysdig, etc.) to monitor container performance. The challenge is to extend these tools so that they work across a hierarchy of edge servers and edge nodes so as to provide an integrated view of system performance. Iteratively, embodiments continue to improve VisEdgeSys based on performance data from testbeds. Additionally, embodiments may adopt agile development methodologies such as continuous integration/continuous deployment (e.g., with Jenkins), to ensure quality control, and quickly push new features and bug updates to the edge computing platform.

In various embodiments, the AI system may utilize data and computation security. A very important concern is the misuse of the system for malicious purposes. Embodiments address two important security concerns for the edge video analytics system (1) Ensuring data security and privacy, and (2) Identifying and authenticating all nodes. Additional security challenges such as distributed denial-of-service-attacks (DDoS), side-channel attacks, and elevation of privileges due to system software bugs, while important, are beyond the scope of the proposed work.

Ensuring node data security and privacy All stored data is encrypted. The proposed data encryption is based on a pseudo random function which is a polynomial time computable function with an index (also called a seed) s and input x. Encrypt is done using a symmetric cryptographic standard such as AES for which hardware support is available on commercial processors (e.g., Intel AES-NI instruction set). At no point are the private keys stored in non-volatile storage; instead, in some embodiments, the hardware based trusted platform module (TPM) generated sealed version (keyblob) of the key is stored. When data is to be unencrypted, the private key is unsealed using TPM from the keyblob, and used to unencrypt the data. Note that the keyblob is specific to a particular hardware, and that a different TPM cannot be used to unseal the keyblob. All partial analytics computations will be maintained in volatile memory; the results of the analysis will be stored in the external storage in an encrypted format. The possibility of hostile devices accessing the RAM via DMA can be addressed using an I/O memory management unit (IOMMU).

In various embodiments, the AI system may utilize node identity, authentication, and secure communication. Embodiments may use the capabilities of TPMs to authenticate the identity of the hardware. Trusted GRUB, which is an extension of the GRUB bootloader may be used to ensure the trustworthiness of the boot process. A chain of trust is built starting from the core root of trust measurement (CRTM) which is an extension of the BIOS, that initially measures the BIOS and extends the integrity test into platform configuration registers (PCR) of the TPM. The BIOS then measures additional ROMs, configuration, and data and extends additional PCRs on the TPM. Afterwards, the BIOS measures the bootloader, and other important system files (for example, kernel modules) allowing the detection of the possible manipulation of these by an adversary. A remote trusted party (cloud) performs the attestation verifying the signature of the encrypted PCRs which it decrypts using a public key. The identity of the edge nodes is verified using the endorsement key, the private part of which is embedded into the TPM at the time of manufacture. For certificate authority, embodiments also leverage open source project such as OpenCA.

The edge video analytics can provide near instantaneous feedback within a specified geography, once behaviors associated with a pedestrian or public safety risk are identified. However, key questions remain as to whether audible environmental alerts (e.g., alarms) are preferred to visual (e.g., flashing lights), or digital alerts (e.g., vibrating smart phones). In the case of pedestrian safety, embodiments may be evaluated using smart traffic signs and signals to guide and alarm both drivers and pedestrians, based on a fully automated vision-based traffic monitoring system. Options include installed signs and signals, portable message signs, pedestrian hybrid beacons, timers, smart lighting (additional lighting to brighten crosswalk when a pedestrian is present in the crosswalk at night), in-pavement flashers, and others. In the case of intelligent policing, the proposed system can directly notify targeted groups of the community (e.g., neighbor groups, business owners, etc.) as well as police departments.

Embodiments described herein have numerous benefits. For example, embodiments provide an AI software product for providing scalable intelligent video surveillance for the artificial intelligence of things. Embodiments observe one or more target objects in video footage of a target environment in real time with minimal latency. Embodiments further detect and identify at an edge node local to the target environment anomalies in the target environment based on observations of one or more target objects in real time, where the one or more anomalies are specific to the target environment.

Figure 17:
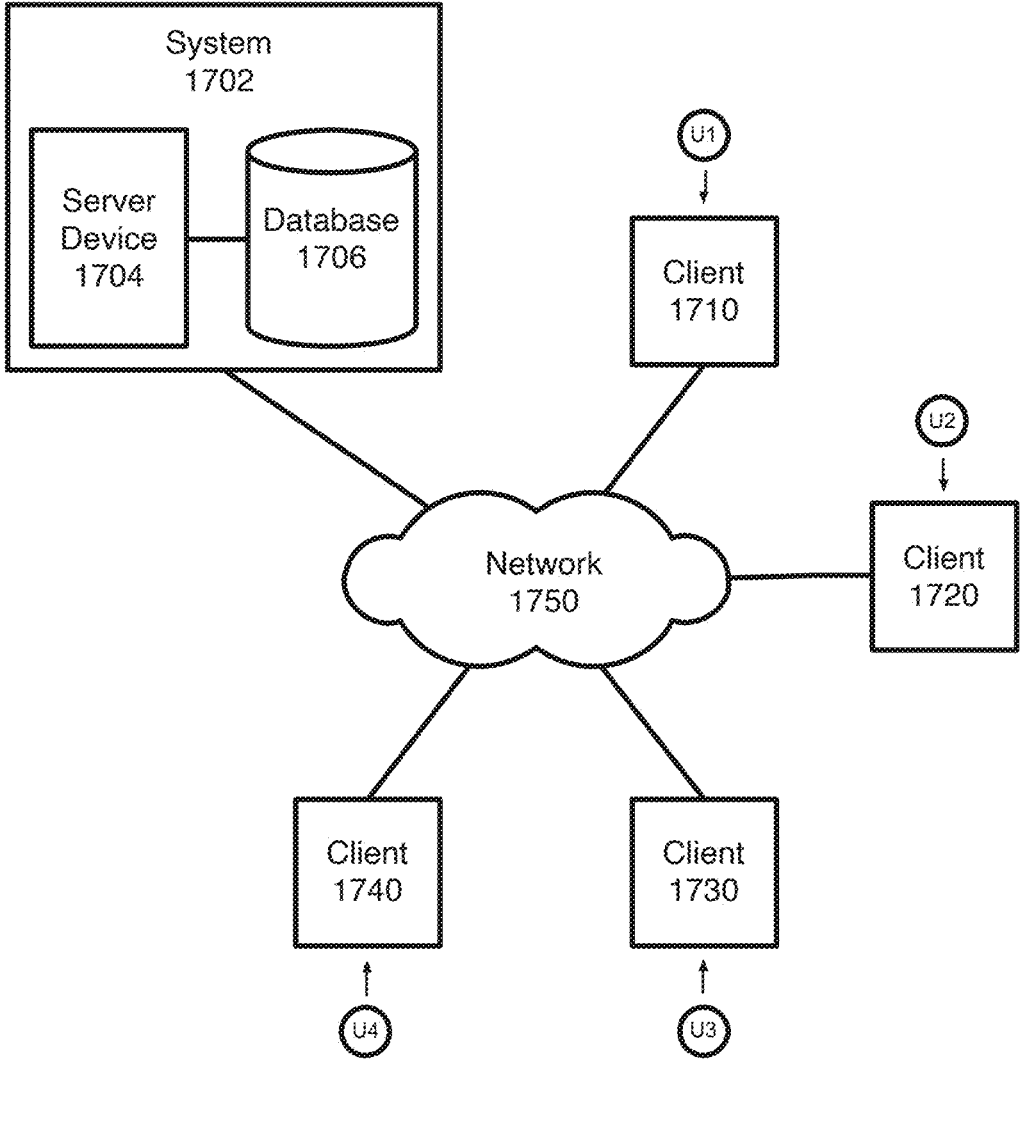
FIG. 17 is a block diagram of an example network environment of the present disclosure.

FIG. 17 is a block diagram of an example network environment 1700 of the present disclosure. In some embodiments, the network environment 1700 includes a system 1702, which includes a server device 1704 and a database 1706. In various embodiments, the system 1702 may be used to implement the AI system 202 of FIG. 2 and/or the system 1602 of FIG. 16, as well as to perform embodiments described herein. The network environment 1700 also includes the client devices 1710, 1720, 1730, and 1740, which may communicate with the system 1702 and/or may communicate with each other directly or via the system 1702. The network environment 1700 also includes a network 1750 through which the system 1702 and the client devices 1710, 1720, 1730, and 1740 communicate. The client devices 1710, 1720, 1730, and 1740 may represent client devices associated with end users and/or may represent any components associated with the AI surveillance system, for example. The network 1750 may be any suitable communication network such as a Wi-Fi network, Bluetooth network, WAN network, LAN network, the Internet, etc.

For ease of illustration, FIG. 17 shows one block for each of the system 1702, the server device 1704, and the network database 1706, and shows four blocks for the client devices 1710, 1720, 1730, and 1740. The blocks 1702, 1704, and 1706 may represent multiple systems, server devices, and network databases. Also, there may be any number of client devices. In other embodiments, the environment 1700 may not have all of the components shown and/or may have other elements including other types of elements instead of, or in addition to, those shown herein.

While the server device 1704 of the system 1702 performs embodiments described herein, in other embodiments, any suitable component or combination of components associated with the system 1702 or any suitable processor or processors associated with the system 1702 may facilitate performing the embodiments described herein.

In the various embodiments described herein, a processor of the system 1702 and/or a processor of any the client device 1710, 1720, 1730, and 1740 cause the elements described herein (e.g., anomaly information, etc.) to be displayed in a user interface on one or more display screens.

Figure 18:
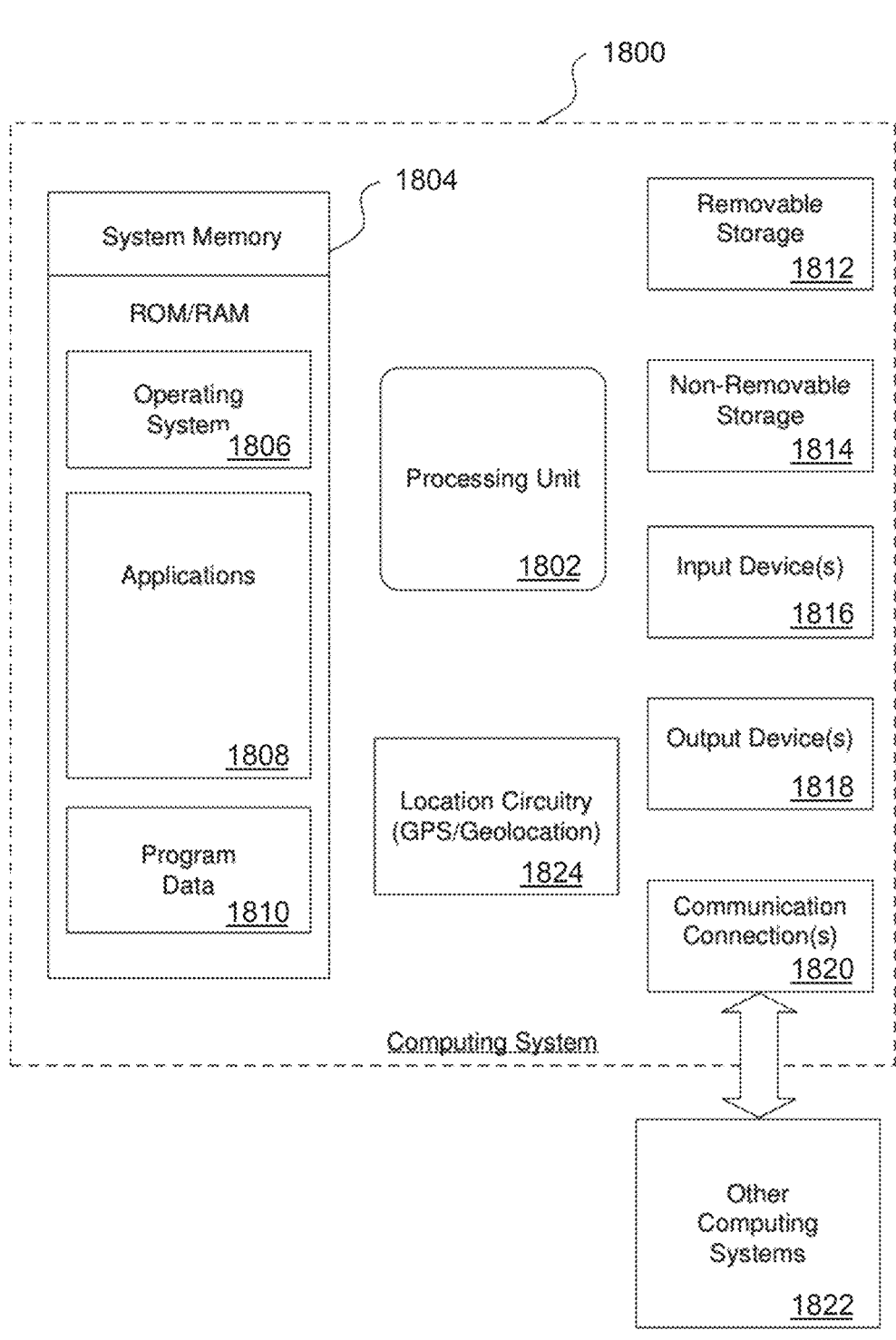
FIG. 18 is a block diagram of an example computing system of the present disclosure.

FIG. 18 is a block diagram of an example computing system 1800 of the present disclosure. The computing system 1800 may be used to implement the AI system 202 of FIG. 2 and/or the system 1602 of FIG. 16 and/or the server system 1702 of FIG. 17, as well as to perform embodiments described herein. The computing system 1800 typically includes at least one processing unit 1802 and a system memory 1804. Depending on the particular configuration and type of computing device, the system memory 1804 may be volatile such as random-access memory (RAM), non-volatile such as read-only memory (ROM), flash memory, and the like, or some combination of volatile memory and non-volatile memory. The system memory 1804 typically maintains an operating system 1806, one or more applications 1808, and program data 1810. The operating system 1806 may include any number of operating systems executable on desktops or portable devices including, but not limited to, Linux, Microsoft Windows®, Apple OS®, or Android®.

The computing system 1800 may also have additional features or functionality. For example, the computing system 1800 may also include additional data storage devices (removable and/or non-removable) such as, for example, magnetic disks, optical disks, tape, or flash memory. Such additional storage may include a removable storage 1812 and a non-removable storage 1814. Computer storage media may include volatile and non-volatile, removable and non-removable media implemented in any method or technology for storage of information, such as computer-readable instructions, data structures, program modules or other data. The system memory 1804, the removable storage 1812, and the non-removable storage 1814 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 1800. Any such computer storage media may be part of the computing system 1800.

The computing system 1800 may also have input device(s) 1816 such as a keyboard, mouse, pen, voice input device, touchscreen input device, etc. Output device(s) 1818 such as a display, speakers, printer, short-range transceivers such as a Bluetooth transceiver, etc., may also be included. The computing system 1800 also may include one or more communication connections 1820 that allow the computing system 1800 to communicate with other computing systems 1822, such as over a wired or wireless network or via Bluetooth (a Bluetooth transceiver may be regarded as an input/output device and a communications connection). The one or more communication connections 1820 are an example of communication media. Available forms of communication media typically carry computer-readable instructions, data structures, program modules or other data in a modulated data signal such as a carrier wave or other transport mechanism and include any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

The computing system 1800 may also include location circuitry 1824. In various embodiments, the location circuitry 1824 may include circuitry including global positioning system (GPS) circuitry and/or geolocation circuitry. The location circuitry 1824 may automatically discern its location based on relative positions to multiple GPS satellites and/or triangulation using cellular carrier network(s) and/or IEEE Standard 802.11 wireless (Wi-Fi) networks (collectively referred to as "geolocation services") to determine location based on multiple cellular communications facilities and/or multiple Wi-Fi networks. The location circuitry 1824, including GPS circuitry and/or geolocation circuitry, is frequently incorporated in smartphones and many other tablets or other portable devices. In various embodiments, computing system 1800 may not have all of the components shown and/or may have other elements including other types of components instead of, or in addition to, those shown herein.

Some, but not all embodiments of the invention have been described above. Indeed, aspects may be embodied in many different forms and should not be construed as limited to the embodiments set forth herein. Rather, these embodiments are provided so that this disclosure will satisfy applicable legal requirements.

The terminology used herein is for the purpose of describing particular embodiments only and is not intended to be limiting of the invention. As used herein, the term "and/or"

includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Although the present disclosure is illustrated and described herein with reference to illustrative embodiments and specific examples provided, it will be readily apparent to those of ordinary skill in the art that other embodiments and examples may perform similar functions and/or achieve like results. All such equivalent embodiments and examples are within the spirit and scope of the present disclosure and are intended to be covered by the following non-limiting claims for all purposes.

What is claimed is:

1. A system comprising:

an edge node configured to receive a sequence of images of a target environment from one or more perception sensors, wherein the edge node is local to the target environment and the one or more perception sensors;

a local node associated with each of the one or more perception sensors of the edge node, wherein each local node comprises an artificial intelligence (AI) pipeline configured to process the sequence of images received from one of the one or more perception sensors to generate a sequence of feature extracted images;

a global node associated with the edge node, wherein the global node is configured to process the sequence of feature extracted images received from the AI pipeline of each of the local nodes and configured to send processed anomaly information to a cloud server;

one or more processors; and logic encoded in one or more non-transitory computer-readable storage media for execution by the one or more processors and when executed operable to cause the one or more processors to perform operations comprising:

receiving the sequence of images of the target environment from the one or more perception sensors;

observing one or more target objects in the sequence of images of the target environment in real time;

generate, utilizing the AI pipeline of the local node, the sequence of feature extracted images including pose information images and movement information images, wherein the sequence of feature extracted images do not indicate facial or gait information;

tracking the one or more target objects utilizing the global node and based on sequences of feature extracted images received from AI pipelines of multiple local nodes; and detecting at the edge node and based on the sequence of feature extracted images one or more anomalies in the target environment based on the observing of the one or more target objects in real time, wherein the one or more anomalies are specific to the target environment.

2. The system of claim 1, wherein the edge node comprises AI technologies that are trained globally for environments in general and trained locally for the target environment.

3. The system of claim 1, wherein the logic when executed by one or more processors is operable to cause the one or more processors to perform operations comprising:

segmenting the sequences of images of the target environment, wherein the sequences of images comprise the sequence of images from each of multiple perception sensors of the one or more perception sensors;

analyzing the one or more target objects in the sequences of images from the multiple perception sensors, wherein the sequences of images provide multiple perspectives of the one or more target objects in the target environment; and detecting at the edge node the one or more anomalies in the target environment based on the analyzing of the one or more target objects.

4. The system of claim 1, wherein the logic when executed by one or more processors is operable to cause the one or more processors to perform operations comprising:

detecting the one or more target objects in the sequences of images, wherein the sequences of images comprise a sequence of images from each of multiple perception sensors of the one or more perception sensors;

computing one or more of pose information, movement information, and gait information associated with each target object of the one or more target objects; and detecting at the edge node the one or more anomalies in the target environment based on the computing of at least one of the pose information or the movement information.

5. The system of claim 1, wherein the target environment is a public environment.

6. The system of claim 1, wherein the logic when executed by one or more processors is operable to cause the one or more processors to perform operations comprising detecting the one or more anomalies in the target environment without collecting personal identification information.

7. The system of claim 1, wherein the situational awareness system comprises legacy components for monitoring the target environment.

8. An artificial intelligence (AI) software product with program instructions, which when executed by one or more processors are operable to cause the one or more processors to perform operations comprising:

receiving, at an edge node, a sequence of images of a target environment from one or more perception sensors, wherein the AI software product resides in the edge node, wherein the edge node is local to the target environment and the one or more perception sensors, wherein the AI software product comprises a local node module associated with each of the one or more perception sensors and a global node module, wherein each local module comprises an AI pipeline configured to process the sequence of images received from one of the one or more perception sensors to generate a sequence of feature extracted images, and wherein the global node module is configured to process the sequence of feature extracted images received from the AI pipeline of each of the local nodes and configured to send processed anomaly information to a cloud server;

observing one or more target objects in the sequence of images of the target environment in real time;

generating, utilizing the AI pipeline of the local node, the sequence of feature extracted images including pose information images and movement information images, wherein the sequence of feature extracted images do not indicate facial or gait information;

tracking the one or more target objects utilizing the global node and based on sequences of feature extracted images received from AI pipelines of multiple local nodes; and detecting at the edge node and based on the sequence of feature extracted images one or more anomalies in the target environment based on the observing of the one or more target objects in real time, wherein the one or more anomalies are specific to the target environment.

9. The software product of claim 8, wherein the edge node comprises AI technologies that are trained globally for environments in general and trained locally for the target environment.

10. The software product of claim 8, wherein the instructions when executed are further operable to cause the one or more processors to perform operations comprising:

segmenting the sequences of images of the target environment, wherein the sequences of images comprise the sequence of images from each of multiple perception sensors of the one or more perception sensors;

analyzing the one or more target objects in the sequences of images from the multiple perception sensors, wherein the sequences of images provide multiple perspectives of the one or more target objects in the target environment; and detecting at the edge node the one or more anomalies in the target environment based on the analyzing of the one or more target objects.

11. The software product of claim 8, wherein the instructions when executed are further operable to cause the one or more processors to perform operations comprising:

detecting the one or more target objects in the sequences of images, wherein the sequences of images comprise a sequence of images from each of multiple perception sensors of the one or more perception sensors;

computing one or more of pose information, movement information, and gait information associated with each target object of the one or more target objects; and detecting at the edge node the one or more anomalies in the target environment based on the computing of at least one of the pose information or the movement information.

12. The software product of claim 8, wherein the target environment is a public environment.

13. The software product of claim 8, wherein the instructions when executed are further operable to cause the one or more processors to perform operations comprising detecting the one or more anomalies in the target environment without collecting personal identification information.

14. The software product of claim 8, wherein the situational awareness system comprises legacy components for monitoring the target environment.

15. A computer-implemented method for detecting anomalies in a target environment, the method comprising:

receiving, at an edge node, sequence of images of the target environment from one or more perception sensors, wherein the edge node is local to the target environment and the one or more perception sensors, wherein the edge node comprises a local node associated with each of the one or more perception sensors and a global node, wherein each local node comprises an artificial intelligence (AI) pipeline configured to process the sequence of images received from one of the one or more perception sensors to generate a sequence of feature extracted images, and wherein the global node is configured to process the sequence of feature extracted images received from the AI pipeline of each of the local nodes and configured to send processed anomaly information to a cloud server;

observing one or more target objects in the sequence of images of the target environment in real time;

generating, utilizing the AI pipeline of the local node, the sequence of feature extracted images including pose information images and movement information images, wherein the sequence of feature extracted images do not indicate facial or gait information;

tracking the one or more target objects utilizing the global node and based on sequences of feature extracted images received from AI pipelines of multiple local nodes; and detecting at the edge node and based on the sequence of feature extracted images one or more anomalies in the target environment based on the observing of the one or more target objects in real time, wherein the one or more anomalies are specific to the target environment.

16. The method of claim 15, wherein the edge node comprises AI technologies that are trained globally for environments in general and trained locally for the target environment.

17. The method of claim 15, further comprising:

segmenting the sequences of images of the target environment, wherein the sequences of images comprise the sequence of images from each of multiple perception sensors of the one or more perception sensors;

analyzing the one or more target objects in the sequences of images from the multiple perception sensors, wherein the sequences of images provide multiple perspectives of the one or more target objects in the target environment; and detecting at the edge node the one or more anomalies in the target environment based on the analyzing of the one or more target objects.

18. The method of claim 15, further comprising:

detecting the one or more target objects in the sequences of images, wherein the sequences of images comprise a sequence of images from each of multiple perception sensors of the one or more perception sensors;

computing one or more of pose information, movement information, and gait information associated with each target object of the one or more target objects; and detecting at the edge node the one or more anomalies in the target environment based on the computing of at least one of the pose information or the movement information.

19. The method of claim 15, wherein the target environment is a public environment.

20. The method of claim 15, further comprising detecting the one or more anomalies in the target environment without collecting personal identification information.

\* \* \* \* \*